(12) United States Patent
Velev et al.

(10) Patent No.: US 8,737,371 B2
(45) Date of Patent: May 27, 2014

(54) ROUTE OPTIMIZATION OF A DATA PATH BETWEEN COMMUNICATING NODES USING A ROUTE OPTIMIZATION AGENT

(75) Inventors: Genadi Velev, Langen (DE); Jens Bachmann, Oberursel (DE); Shinkichi Ikeda, Kanagawa (JP); Jun Hirano, Osaka (JP)

(73) Assignee: Optis Wireless Technology, LLC, Plano, TX (US)

( * ) Notice: Subject to any disclaimer, the term of this patent is extended or adjusted under 35 U.S.C. 154(b) by 15 days.

(21) Appl. No.: 13/262,907

(22) PCT Filed: Apr. 19, 2010

(86) PCT No.: PCT/EP2010/002389
§ 371 (c)(1),
(2), (4) Date: Nov. 10, 2011

(87) PCT Pub. No.: WO2010/121771
PCT Pub. Date: Oct. 28, 2010

(65) Prior Publication Data
US 2012/0044949 A1 Feb. 23, 2012

(30) Foreign Application Priority Data
Apr. 20, 2009 (EP) .................................. 09005529

(51) Int. Cl.
*H04Q 7/24* (2006.01)
*H04W 8/08* (2009.01)
*H04W 48/16* (2009.01)
*H04W 80/04* (2009.01)

(52) U.S. Cl.
CPC .............. *H04W 8/082* (2013.01); *H04W 48/16* (2013.01); *H04W 80/04* (2013.01)
USPC .......................................... 370/338; 370/401

(58) Field of Classification Search
CPC ...... H04W 8/082; H04W 48/16; H04W 80/04
USPC .................................. 370/328–338, 400, 401
See application file for complete search history.

(56) References Cited

U.S. PATENT DOCUMENTS

| | | | |
|---|---|---|---|
| 2002/0009066 A1* | 1/2002 | Shimizu et al. | 370/338 |
| 2003/0093553 A1* | 5/2003 | Le et al. | 709/238 |
| 2006/0135159 A1* | 6/2006 | Andersen et al. | 455/435.1 |

FOREIGN PATENT DOCUMENTS

| | | |
|---|---|---|
| EP | 1 863 251 | 12/2007 |
| WO | 03/041358 | 5/2003 |
| WO | 2009/024182 | 2/2009 |

OTHER PUBLICATIONS

International Search Report dated Oct. 14, 2010.
(Continued)

*Primary Examiner* — Pao Sinkantarakorn
(74) *Attorney, Agent, or Firm* — Nixon & Vanderhye, P.C.

(57) ABSTRACT

The invention relates to optimizing a data path between two communication nodes. A route optimization agent (ROA) is determined in the current network of the second communication node, preferably on the data path between the two communication nodes. Then, an IP tunnel is established between the first communication node and the ROA, the IP tunnel and the corresponding security association of said IP tunnel being based on the home address of the first communication node in its home network. The first communication node may have two IP tunnels based on the same home address, one to its home agent and one to the ROA. Corresponding routing entries and binding cache entries need to be established in the ROA and the first communication node so that all data packets between the two communication nodes are exchanged via the established IP tunnel over the ROA.

15 Claims, 10 Drawing Sheets

(56) References Cited

OTHER PUBLICATIONS

3GPP TS 23.401 V8.4.1, "3rd Generation Partnership Project; Technical Specification Group Services and System Aspects; General Packet Radio Service (GPRS) enhancements for Evolved Universal Terrestrial Radio Access Network (E-UTRAN) access (Release 8)," XP050363627, Dec. 2008, pp. 1-219.

3GPP TSG SA WG2 Meeting #76, "Discussion on LIPA_SIPTO Solution," ZTE, TD S2-096637, XP050397577, Nov. 16-20, 2009, pp. 1-6.

3GPP 23.829 V1.0.1, "3rd Generation Partnership Project; Technical Specification Group Services and System Aspects; Local IP Access and Selected IP Traffic Offload (Release 10)," XP050402025, Mar. 2010, pp. 1-37.

A. Cabellos-Aparicio, et al., "Mobility Agents: Avoiding the Route Optimization Signaling on Large Servers," IEEE International Symposium on Personal, Indoor and Mobile Radio Communications, XP031168684, Sep. 1, 2007, pp. 1-11.

D. Johnson, et al, "Mobility Support in IPv6," RFC 3775, Jun. 2004, pp. 1-165.

* cited by examiner

ROUTE OPTIMIZATION OF A DATA PATH
BETWEEN COMMUNICATING NODES
USING A ROUTE OPTIMIZATION AGENT

FIELD OF THE INVENTION

The invention relates to a method for optimizing a data path between two communicating nodes in which an optimized data route is established over a route optimization agent in the second communicating nodes' network. Furthermore, the invention relates to a mobile node, a route optimization agent, and a gateway that participate in the invention.

TECHNICAL BACKGROUND

Communications systems evolve more and more towards an Internet Protocol (IP)-based network. They typically consist of many interconnected networks, in which speech and data is transmitted from one terminal to another terminal in pieces, so-called packets. IP packets are routed to the destination by routers in a connection-less manner. Therefore, packets comprise IP header and payload information, and the header comprises, amongst other things, a source and destination IP address.

For scalability reasons, an IP network uses a hierarchical addressing scheme. Hence, an IP address does not only identify the corresponding terminal, but additionally contains location information about this terminal. With additional information provided by routing protocols, routers in the network are able to identify the next router towards a specific destination.

Tunneling is a mechanism that is used for transmitting data packets as a payload of another data packet, i.e. for transporting a data packet encapsulated by another protocol of the same particular OSI layer. A logical construct called a tunnel is established between the device that encapsulates and the device that decapsulates, wherein the process itself is referred to as tunneling. The tunneling may be used for transmitting data packets over networks that support different network protocols, e.g. an IPv6 packet needs to be encapsulated in an IPv4 packet for transport over an IPv4 network. Tunneling may also be used to provide a secure transport of data over a network that is considered as insecure. For instance, the IP security Protocol (IPsec) can be used to tunnel a data between authenticated entities transparently for the underlying networks that connect both entities.

Usually, when a terminal powers on, it configures an IP address that is based on the IP address prefix of the access network. If a terminal is mobile (so-called mobile node, MN) and moves between subnets with different IP prefix addresses, it must change its IP address to a topological correct address due to the hierarchical IP addressing scheme. However, since transport layer connections, such as TCP connections are bound to the IP addresses (and ports) of the communicating nodes, the connection to the active IP sessions breaks if one of the nodes changes its IP address, e.g. due to movement. One possible protocol to address said problem is the MIPv6 protocol.

Mobile IPv6 (MIPv6)

Mobile IPv6—also denoted as MIPv6—(see D. Johnson, C. Perkins, J. Arkko, "Mobility Support in IPv6", IETF RFC 3775, June 2004, available at http://www.ietf.org and incorporated herein by reference) is an IP-based mobility protocol that enables mobile nodes to move between subnets in a manner transparent for higher layers and applications, i.e. without breaking higher-layer connections. That is, the mobile nodes remain reachable while moving around in the IPv6 internet network. The main principle of MIPv6 is that a mobile node is always identified by its Home Address (HoA), regardless of its topological location in the internet, while a Care-of Address (CoA) of the mobile node provides information about the current topological location of the mobile node. The MIPv6 protocol is usually used in non-3GPP networks.

In more detail, a mobile node has two IP addresses configured: a Care-of Address and a Home Address. The mobile node's higher layers use the Home Address for communication with the communication partner (destination terminal), from now on called Correspondent Node (CN). This address does not change and serves the purpose of identification of the mobile node. Topologically, it belongs to the Home Network (HN) of the mobile node. In contrast, the Care-of Address changes on every movement that results in a subnet change and is used as the locator for the routing infrastructure. Topologically, it belongs to the network the mobile node is currently visiting. One out of a set of Home Agents (HA) located on the home link maintains a mapping of the mobile node's Care-of Address to mobile node's Home Address and redirects incoming traffic for the mobile node to its current location. Reasons for deploying a set of home agents instead of a single home agent may be redundancy and load balancing.

Mobile IPv6 currently defines two modes of operation: bi-directional tunneling (FIG. 1) and route optimization (FIG. 2). Using bi-directional tunneling, data packets sent by the correspondent node 101 and addressed to the home address of the mobile node 102 are intercepted by the home agent 111 in the home network 110 and tunneled to the Care-of address of the mobile node 102, which is anchored at the foreign network 120. Data packets sent by the mobile node 102 are reverse tunneled to the home agent 111, which decapsulates the packets and sends them to the correspondent node 101. Reverse tunneling means that packets are transmitted by the mobile node via an additional reverse tunnel (to complement the "normal" one) that starts at the mobile node and terminates at the home agent.

For this operation in MIPv6, only the Home Agent 111 is informed about the Care-of Address of the mobile node 102. Therefore, the mobile node sends Binding Update (BU) messages to the Home Agent. These messages are sent over an IPsec security association, and thus are authenticated and integrity protected.

A drawback is that if the mobile node is far away from the home network and the correspondent node is close to the mobile node, the communication path is unnecessarily long, resulting in inefficient routing and high packet delays.

In order for the MN to have an IPsec association with the HA, the MN needs to perform bootstrapping a-priori. Bootstrapping is the process of obtaining at least the following information: a home address, a home agent address, and a security association with home agent. This information is needed before the MN registers a CoA with the home agent. The process may last several seconds because several round-trip-times between MN and HA are needed.

The route optimization mode (see FIG. 2) can prevent the inefficiency of the bi-directional tunneling mode by utilizing the direct path between correspondent node and mobile node. RO requires the MN to register its current binding of the home address to care-of-address at the CN. Correspondingly, the CN establishes a binding cache entry, so that packets from the CN can be routed directly to the CoA of the MN, without the detour over the HA of the MN1. When sending a packet to any IPv6 destination, the CN checks its cached bindings for an entry of the packet's destination address.

When using route optimization, the mobile node sends binding update messages to the correspondent node to support mobility, which then is able to directly send data packets to the mobile node (a type 2 routing header is used to send the packets destined to the mobile node's home address on the direct path to the mobile node's care-of address).

The protection of Binding Updates sent to correspondent nodes does not require the configuration of security associations or the existence of an authentication infrastructure between the mobile nodes and correspondent nodes. Instead, a method called the Return Routability (RR) procedure is used to assure that the right mobile node is sending the message.

The Return Routability procedure enables the correspondent node to obtain some reasonable assurance that the mobile node is in fact addressable at its claimed Care-of address as well as at its Home address. Only with this assurance is the correspondent node able to accept Binding Updates from the mobile node which would then instruct the correspondent node to direct that mobile node's data traffic to its claimed Care-of address.

This is done by testing whether packets addressed to the two claimed addresses are routed to the mobile node. The mobile node can pass the test only if it is able to supply proof that it received certain data (the "keygen tokens") which the correspondent node sends to those addresses. The exchange of the cryptographic tokens is based on the HoTi/HoT and CoTi/CoT message exchanged. These data are combined by the mobile node into a binding management key. The integrity and authenticity of the Binding Updates messages to correspondent nodes is protected by using the binding management key.

Thus, MIPv6 allows to optimize the route between the CN and the MN by allowing a mapping in the CN of the HoA and CoA of the MN, so that the CN can communicate directly with the MN.

A mobile node may have several home agents and thus may establish several security associations for the corresponding IPsec tunnels, one to each home agent. For each home agent, the mobile node configures a different home address, which is used for communication. Thus, depending on the source address of the data packet, the data packet is transmitted over the appropriate IPsec tunnel to the corresponding home agent. Mobile IP is categorized as host-based (or client-based) mobility management, since the mobility-related signalling is between the host (or client) and the HA. Hence, it is sometimes called Client Mobile IP (CMIP).

Proxy MIPv6 (PMIPv6)

Another approach, targeting the IP mobility management in limited geographical regions, is managed by the network and therefore is transparent to the MN. This approach is referred to as network-based, localized IP mobility.

One main characteristic of network-based mobility is that the access network entities are appropriately configured to detect the MN movement and to exchange information about the current location of the MN, so that the MN does not need to be involved in the mobility process. Therefore, the mobility-related signaling over the wireless interface is avoided. Other advantages of the network-based mobility management are less packet overhead over the air, since no MIPv6 encapsulation is needed, and mobility support for simple IP nodes (i.e., non-MIP-capable nodes). The Internet Engineering Task Force (IETF) organisation is working on such an approach for localized mobility management based on the Mobile IP protocol. Since a network entity is acting as a proxy on behalf of the MN, the protocol is called Proxy Mobile IP (PMIP). There is a variant for IPv6 called PMIPv6 and a variant for IPv4 called PMIPv4. Most of the embodiments of this invention assume PMIPv6 as protocol for network-based mobility management, but the invention is not limited to PMIPv6. It may also be applicable to other network-based mobility management protocols such as PMIPv4.

To provide mobility support to any IPv6 host within a restricted and topologically localized portion of the network and without requiring the participation of the host, proxy mobile IP (PMIP) introduces a new logical entity called Mobile Access Gateway (MAG) which is the proxy mobility agent in the MN's network which manages the mobility related signaling for a mobile node that is attached to its access link. It is the entity responsible for tracking the mobile node's attachment to the link and for signaling the mobile node's local mobility anchor. The MAG is usually co-located with the access router (AR) and performs Mobile IPv6 signaling on behalf of the mobile node, e.g. can send BU messages on behalf of a MN. These BU messages are marked with a flag, so that they can be identified as Proxy BU (PBU) messages.

A Local Mobility Anchor (LMA) is the home agent for the mobile node in the Proxy Mobile IPv6 domain. It is the topological anchor point for the mobile node's home prefix and is the entity that manages the mobile node's reachability state. It is important to understand that the LMA has the functional capabilities of a home agent as defined in the Mobile IPv6 base specification and with the additional required capabilities for supporting Proxy Mobile IPv6. Usually one LMA is connected to multiple MAGs by means of secure IPsec tunnels.

When using PMIPv6, a Home Network Prefix is allocated to the mobile node by the LMA. The mobile node can then configure an IP address based, say home address, on that prefix. Said home address is used for all communication sessions and does not change while the mobile node remains in the current PMIP domain. A correspondent node in communication with the mobile node transmits data packets destined to the home address of the mobile node. The home address has the IP prefix of the LMA; thus, the data packets are routed to the LMA, that in turn tunnels the data packets over the PMIP tunnel to the MAG. The MAG decapsulates these data packets and knows from a corresponding routing entry that data packets destined to the home address of the mobile node are to be forwarded to the mobile node, though the IP prefix of said home address is allocated at the LMA.

IPsec Protocol and the Security Associations

Generally, IPsec provides security services at the IP layer for higher-layer protocols and applications in order for them to communicate securely. That is, IPsec sets up a secure path between two communicating nodes over insecure intermediate systems. In this respect, IPsec is composed of several components to provide security service, wherein the two main ones are the Authentication Header (AH) protocol and the Encapsulating Security Payload (ESP) protocol. They provide authenticity and privacy to IP data by adding particular headers to the IP data packet.

There exist two modes of IPsec operation. On the one hand the transport mode operation and on the other hand the tunnel mode operation. In transport mode, only the payload of the data packet is encrypted. It is fully routable since the IP header is sent as plain text. In tunnel mode, the entire IP packet is encrypted. It must then be encapsulated into a new IP packet for the routing process. Tunnel mode is used for network-to-network communications, i.e. for setting up secure tunnels between routers.

IPsec is used for instance between a mobile node and its home agent. In order for a mobile node to have an IPsec security association with the HA, the MN needs to perform bootstrapping a-priori. Thus, even if the mobile node is attached to a foreign network, encrypted and/or authenticated/authorized communication between the home agent and the mobile node (e.g. through a secured tunnel) may be ensured.

IKEv2 is used for performing mutual authentication, as well as establishing and maintaining IPsec Security Associations (SAs). In the base IKEv2 protocol, the IKE SAs and tunnel mode IPsec SAs are created implicitly between the IP addresses that are used when the IKE_SA is established. The IKE_SA is used to negotiate shared keys between the communication partners. These shared keys are then used in the negotiation for the IPsec SA. Furthermore, the IPsec SA defines the communication partners, and which packets are to be transmitted to which IP address, and the encryption used for the transmission of said packets etc. These IP addresses are then used as the outer (tunnel header) addresses for tunnel mode IPsec packets.

As apparent from above, the IPsec tunnel based on the security association is typically established between the addresses of the endpoints, e.g. to the home agent address and one of the mobile node's addresses e.g. the care-of address in case of MIPv6. On the other side, the home address of the mobile node is used as identifier of the security association or as identifier of the IPsec (or MIP) tunnel. Usually the home address is assigned by the home agent and it is derived from the address space of the home agent, i.e. the home address is topologically correct in the home agent.

LTE—Long Term Evolution

The 3GPP ($3^{rd}$ Generation Partnership Project) launched a study item "Evolved UTRA and UTRAN" better known as "Long Term Evolution (LTE)". The study will investigate means of achieving major leaps in performance in order to improve service provisioning, and to reduce user and operator costs. Out of that and because interworking with other radio access technologies should be possible, the need arose for a new evolved Packet Core Network.

An exemplary representation of the E-UTRAN architecture is given in FIG. 3. The E-UTRAN consists of evolved Node Bs (eNB or eNodeB), providing the E-UTRA user plane (PDCP/RLC/MAC/PHY) and control plane (RRC) protocol terminations towards the mobile node.

The eNB hosts the Physical (PHY), Medium Access Control (MAC), Radio Link Control (RLC), and Packet Data Control Protocol (PDCP) layers that include the functionality of user-plane header-compression and encryption. It also offers Radio Resource Control (RRC) functionality corresponding to the control plane. Further, it performs many functions including radio resource management, admission control, scheduling, enforcement of negotiated UL-QoS (Uplink Quality of Service), cell information broadcast, ciphering/deciphering of user and control plane data, and compression/decompression of DL/UL (Downlink/Uplink) user plane packet headers. The eNBs are connected to the Serving Gateway (S-GW) by means of the S1-U interface.

The S-GW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and Packet Data Network Gateway). For idle state UEs, the S-GW terminates the DL data path and triggers paging when DL data arrives for the UE. It manages and stores UE contexts, e.g. parameters of the IP bearer service, network internal routing information. It also performs replication of the user traffic in case of lawful interception.

The Mobility Management Entity (MME) is an entity from the Evolved Packet Core Network of a 3GPP cellular network that is responsible for the mobility management and session management of the MN. The mobility management is handled in both MN states: connected (when the MN is connected to an (e)NB), i.e. RRC connection and Radio Bearers between the MN and (e)NB are established) or IDLE (when the MN is registered at the PLMN (public land mobile network) but not connected to a particular (e)NB). The MME manages the discovery of the PGW and SGW for the MN and the tunnel establishment between the (e)NB and the SGW/PGW. The MME is connected to an eNB via the S1-MME interface that applies the S1-AP (Application) protocol for message exchange. Further, the MME is connected to the SGW via the S11 interface.

The Packet Data Network Gateway (PDN-GW or PGW) provides connectivity for the UE to external packet data networks by being the point of exit and entry of traffic for the UE. A UE may have simultaneous connectivity with more than one PDN-GW for accessing multiple PDNs. The PDN-GW performs MN IP address allocation, policy enforcement, packet filtering (e.g. deep packet inspection, packet screening) for each user in order to map the MN's traffic to an appropriate QoS level. The PGW performs the function management of a HA in case of MIPv6 and of LMA in case PMIPv6 protocols are used for mobility. The PGW is connected to the SGW via the S5 interface, if the SGW is located in the same PLMN, or via the S8 interface if the SGW is located in a foreign (visited) PLMN.

Another key role of the PDN-GW is to act as the anchor for mobility between 3GPP and non-3GPP technologies. The 3GPP LTE system differentiates between 3GPP and non-3GPP access networks. The 3GPP access networks are based on access technologies standardized by the 3GPP organization. The MN mobility within the 3GPP access networks is usually managed by network-based mechanisms, e.g. PMIPv6 as described above. The non-3GPP access networks are based on access technologies defined by other organizations like Institute of Electrical and Electronics Engineers (IEEE) and $3^{rd}$ Generation Partnership Project 2 (3GPP2). The MN mobility within the non-3GPP access networks can be managed either by host-based mobility mechanism (e.g. MIPv6) or network-based mechanisms (e.g. PMIPv6).

When the mobile terminal is active in a non-3GPP access network, there is a local IP address used to route packets to the mobile terminal in the non-3GPP access. This IP address is the Care-of Address in the terminology of Mobile IP. In case of DSMIPv6, the address is assigned to the mobile terminal, and the mobile terminal is sending Binding Updates using its Care-of address to the PDN-GW, which has the function of the Home Agent (HA). In case of PMIPv6, the Care-of address is an address of a Mobile Access Gateway (MAG) that is located in the non-3GPP access network, and the MAG is sending Proxy Binding Updates using its (Proxy-) Care-of Address to the PDN-GW of the 3GPP network, which has the function of the Local Mobility Anchor (LMA). However, the MN has only one address in PMIP, namely the IP address allocates at the LMA.

Public Land Mobile Networks

A public land mobile network (PLMN) is a network that is established and operated by an administration or by a recognized operating agency for providing land mobile telecommunications services. PLMNs interconnect with other PLMNs and Public switched telephone networks (PSTN) for telephone communications or with internet service providers for data and internet access. A PLMN may be considered as an extension of a fixed network, e.g. the Public Switched Telephone Network (PSTN) or as an integral part of the PSTN. This is just one view-point on PLMN. PLMN mostly refers to the whole system of hardware and software which enables wireless communication, irrespective of the service area or service provider. A separate PLMN may be defined for each country or for each service provider.

Every PLMN organisation has its own management infrastructure, which performs different functions depending on the role played and the equipment used by that entity. However, the core management architecture of the PLMN organisation is similar, such as:
- providing services to its customers;
- infrastructure to fulfill the services (advertise, ordering, creation, provisioning, . . . );
- assuring the services (Operation, Quality of Service, Trouble Reporting & Fixing . . . );
- billing the services (Rating, Discounting, . . . ).

Not every PLMN organisation will implement the complete Management Architecture and related processes. Some processes may be missing depending on the role a particular organisation is embodying. Processes not implemented by a particular organisation are accessed via interconnections to other organisations, which have implemented these processes. The Management architecture itself does not distinguish between external and internal interfaces.

A MN subscribed to 3GPP services has a home PLMN (HPLMN) that maintains the subscription data and allowed services and QoS levels. When MN is attached to a network different from the HPLMN, the MN is indicated as roaming node and the visited network is denoted as visited PLMN (VPLMN).

In general, "roaming" can be defined as the ability for a cellular customer to automatically make and receive voice calls, send and receive data, or access other services, including home data services, when travelling outside the geographical coverage area of the home network, by means of using a visited network.

The differentiation between HPLMN and VPLMN is technically given by the type of subscriber entry in a specific network. When a mobile device enters a new visited network and has no entry in the home subscriber register of the network (e.g. Home Location Register, HLR, in GSM networks or local customer database in WLANs), the required subscriber data must first be requested by the visited network e.g. from the subscriber's home network in order that the subscriber can be authenticated and any authorization for using the network services can be checked. The "visiting" subscriber acquires an entry in a user database of the visited network (e.g. Visited Location Register, VLR) and the authorized network services are enabled. If there is no roaming agreement between the two networks, i.e. HPLMN and VPLMN, maintenance of service is impossible, and service is denied by the visited network.

Home (e)NodeB, Local IP Access (LIPA) and Selected IP Traffic Offload (SIPTO)

The usual term used for a base station in the 3GPP specifications is node B (NB, for the UMTS radio access network) or evolved node B (eNB, for the LTE radio access network). The area of coverage of an NB/eNB is called NB/eNB cell or a macro cell. In the recent evolution 3GPP specified base stations called Home (e)NodeB (abbreviated as H(e)NB) that could be deployed by private organisations or enterprise networks. These H(e)NBs could be connected to the operator's core network via DSL or other secure fixed-line connection.

A H(e)NB provides services only to limited users allowed to associate with the H(e)NB. This service offered by the H(e)NB access is known as Closed Subscriber Group (CSG) service. This introduces a main difference to the usual (e)NB macro cell where all users can attach to an (e)NB if they are allowed to attach to the PLMN, to which the (e)NB is connected.

A further new feature in the cellular networks is the ability of the radio access network to route the MN's IP traffic directly to the Internet (or to the correspondent node) without traversing the operator's core network. This new feature can be applied when the MN is attached to either a usual macro (e)NB cell or to a micro H(e)NB cell. In 3GPP, Local IP access (LIPA) and Selected IP traffic offload (SIPTO) are defined when the MN's IP traffic is directly routed without traversing the core network.

In case the MN is attached to a usual macro (e)NB cell the 3GPP specification talks about SIPTO. Usually the term LIPA is used in case of MN-initiated local IP traffic routing when the UE is attached to a micro H(e)NB cell of a residential or enterprise IP network. On the other hand the term SIPTO is used when the network-side decides to perform local IP traffic routing when the MN is attached to micro H(e)NB cell or to macro (e)NB cell.

In order to perform a LIPA or SIPTO it is assumed that a local gateway (called herewith L-PGW) is used. The MN's traffic goes via the L-PGW to the destination IP network or correspondent node. The L-PGW can be located in the access network or above the access network; however, it is important that the L-PGW is located in such a way that the core network is offloaded.

In some aspects the LIPA/SIPTO local forwarding has a similar concept as the Local Break-Out (LBO) known from the roaming scenario, where also a local (visited) PGW in the visited PLMN (VPLMN) is deployed. One main difference between LIPA/SIPTO and LBO is that LBO is a term used only for roaming mobile nodes in visited PLMNs, whereas the LIPA/SIPTO is a local routing within or above the access network of one PLMN. A further main difference is that the PGW in case of LBO is located in the Core network, whereas the local PGW in case of LIPA/SIPTO is usually located in the access network (RAN) or close to the access network; and in case of LIPA—in the residential/enterprise IP network. With other words, LBO can be observed as offloading merely the HPLMN's core network, but the MN's traffic still traverses the VPLMN's core network.

Route Optimizations

Because of an increasing demand for real-time IP based applications and a need for handling vast volumes of user traffic, an efficient packet routing is becoming more and more important. The end-to-end latency of user traffic should be minimized, for instance, to satisfy the requirements of interactive applications.

FIG. 4 shows an exemplary scenario in which two mobile nodes, MN1 and MN2, are communicating with each other, wherein both MNs are in the same VPLMN. However, the data traffic is transmitted via the home agents of the MNs, i.e. over MN1's HA, PGW1, in HPLMN1 and over MN2's HA, PGW2, in HPLMN2. This is illustrated with the continuous bold line. For this scenario it is assumed that MN1 uses MIPv6 for mobility management, and MN2 uses PMIPv6. Therefore, an MIPv6 tunnel spans from MN1 over the VPLMN to PGW1. In 3GPP the MIPv6 interface is called S2c interface. Similarly, a PMIPv6 tunnel goes from the Serving Gateway, being the MN2's MAG, to PGW2, being the MN2's LMA.

For instance, the HPLMNs of MN1 and MN2 may be located in one continent (Europe), and both nodes are currently roaming to another continent (USA). In this case, the data packets exchanged between the two nodes are traversing a very long distance, resulting in long delays and inefficient routing.

As already mentioned with reference to FIG. 2, MIPv6 provides a mechanism for route optimization. Since MN1 is using MIPv6, it can perform the RR/RO for MIPv6. The thus optimized route is illustrated in FIG. 5. However, since MN2 is not at its HPLMN, the completion of MIPv6 RO procedure would result in merely avoiding the data traffic to flow through the HPLMN1, but still the traffic flows from VPLMN (USA) to HPLMN2 (Europe) and back to the VPLMN (USA). As apparent therefrom, the data route is not optimal and still has long delays and inefficient routing.

In addition, MN2 needs to participate in the MIPv6 route optimization, and thus needs to support MIPv6. It should also be noted that MN2 cannot perform MIPv6 RO to avoid the detour over its HA in HPLMN2, since MN2 already uses PMIPv6 for mobility management. Therefore, to have an optimal route it is necessary that MN2 is able to use MIPv6 to also perform the RR/RO procedure in the other direction.

In case that the mobile node is attached to a visited network (PLMNs) two modes of operation are possible with respect to the data traffic forwarding—home-routed traffic and local break-out. The home-routed traffic means that the MN gets the IP configuration from its HPLMN, and all the traffic is always routed between MN and HPLMN over the VPLMN. The home-routed traffic mode is implemented by establishing a PMIP tunnel between the VPLMN and HPLMN (indicated as S8 interface above). In case of LBO, the MN gets the IP configuration from the VPLMN, and the data traffic is not routed to the HPLMN, but from the MN over the VPLMN to the correspondent node directly. The operation mode is initiated by the MN, as during the attach procedure, the MN requests for a connection (also called PDN connection) to a particular Access Point Name. If the PGW of the requested APN is located in the HPLM, the MN's PDN connection is called home-routed. If the PGW corresponding to the requested APN is located in the VPLMN, the MN's PDN connection is denoted LBO.

In case MN1 uses LBO, the optimized data route is depicted in FIG. 5, which is practically the same as for MIPv6 RO performed by MN1. Again, the route is not the optimal one.

In addition, MN2 may also use the LBO mode of operation, which would indeed result in the optimal data route illustrated in FIG. 4 with the dashed line. Both nodes would establish new PDN connections to new PGWs located in the VPLMN. For example, if the AGW is located in the VPLMN's core network and offers corresponding PGW functionality, MN1 can use it as local PGW for LBO. Analogically, if the SGW offers the PGW functionality, MN2 can use it as local PGW in the VPLMN for LBO.

However, the LBO operation has serious disadvantages.

For instance, the establishment of connections to new local PGWs must be completed before the data communication starts, because the mobile nodes would configure new IP addresses that are topologically correct in the VPLMN and those IP addresses are used for communication between the mobile nodes. Therefore, already established sessions using the home address of MN2 will be interrupted due to said IP address change. Consequently, it is necessary to perform the LBO before the data communication starts, which requires synchronization between the mobile nodes and even coordination between the HPLMNs. Further, the LBO set-up is a time and signalling consuming process. It would be advantageous to have a route optimization that can be performed at any time during or before the actual communication.

One example to perform synchronization between the mobile nodes to set up the LBO before the beginning of data communication is to use higher layer protocols, such as application layer protocol e.g. Session Initiation Protocol (SIP). The synchronization of the application layer protocols and the network layer protocols would require special implementation mechanisms in both mobile nodes, which results in lack of backwards compatibility. Also, another disadvantage of using application layer signalling is that the RO path can be set up only for those kinds of applications, for which the application layer signalling is needed, e.g. only SIP-based applications.

Furthermore, a route optimization with reduced signalling load and delay for the set up of the route optimized path would be beneficial.

SUMMARY OF THE INVENTION

Therefore, in view of the above problems in the state of the art, one object of the invention is to provide an improved method of optimizing a data path between two communicating nodes, wherein at least one of the communication nodes is currently located in foreign network, i.e. roaming.

At least one of the above objects is solved by the subject matter of the independent claims. Advantageous embodiments of the invention are subject-matters of the dependent claims.

According to a first embodiment of the invention, a method is provided for optimizing a data path along which data packets are exchanged between a first communication node and a second communication node in a communications system. At least the first communication node is located in a foreign network. The first communication node transmits a local connection request to a management entity of the first communication node in the foreign network, the local connection request comprising identity information of the second communication node. In response to the received local connection request, the management entity in the foreign network determines a local data gateway in the foreign network based on the identity information of the second communication node. The local data gateway is determined to be a gateway of the second communication node in the foreign network or a gateway of the first communication node in the foreign network. All data packets between the first and second communication node are exchanged via the local data gateway.

According to an advantageous embodiment of the invention, the local data gateway is the gateway used by the second communication node, and a tunnel is established between a radio control entity, to which the first communication node is attached in the foreign network, and the local data gateway. The data packets are forwarded between the radio control entity and the local data gateway over the established tunnel.

With regard to a further embodiment of the invention, the management entity in the foreign network instructs the radio control entity and the local data gateway to establish the tunnel between them.

In another embodiment of the invention, the management entity in the foreign network determines the gateway used by the second communication node based on the identity information of the second communication node.

According to an advantageous embodiment of the invention, the identity information of the second communication node is an IP (Internet Protocol) address, and the management entity in the foreign network infers the gateway used by the second communication node from the IP prefix of the IP address of the second communication node.

Referring to a further embodiment of the invention, the management entity in the foreign network transmits a request to a management entity of the second communication node, which in response transmits information on the gateway used by the second communication node to the management entity of the first communication node.

Another embodiment of the invention suggests to transmit by the first communication node a gateway detection message towards the second communication node. An intercepting entity on the data path between the first and second communication nodes intercepts the gateway detection message and transmits in response a gateway detection reply message to the first communication node comprising information on the gateway used by the second communication node. The local gateway request transmitted from the first communication node to the management entity of the first communication node comprises the received information on the gateway used by the second communication node. The gateway used by the second communication node is determined by the management entity based on the information on the gateway used by the second communication node received in the local gateway request.

In a further embodiment of the invention a routing entry associating the home address of the first communication node with the established tunnel to the radio control entity is defined in the local data gateway for forwarding data packets, coming from the second communication node and destined to the home address of the first communication node, from the local data gateway to the radio control entity using the established tunnel.

According to a further embodiment of the invention, the local data gateway is the gateway used by the second communication node, and a serving gateway of the first communication node is determined by the management entity to be the local serving gateway of the first communication node. A tunnel is established between the serving gateway of the first communication node in the foreign network and the local data gateway. The data packets are forwarded between the serving gateway and the local data gateway over the established tunnel. A second tunnel is established between a radio control entity, to which the first communication node is attached in the foreign network, and the serving gateway of the first communication node, wherein the data packets are forwarded between the radio control entity and the serving gateway of the first communication node over the established second tunnel.

For another embodiment of the invention, the management entity of the first communication node instructs the serving gateway to establish the tunnel with the local data gateway, and instructs the serving gateway and the radio control entity to establish the second tunnel.

Regarding an advantageous embodiment of the invention, in the local data gateway a routing entry is defined associating the home address of the first communication node with the established tunnel to the serving gateway for forwarding data packets, coming from the second communication node and destined to the home address of the first communication node, from the local data gateway to the serving gateway using the established tunnel. In the serving gateway of the first communication node another routing entry is defined associating the home address of the first communication node with the established second tunnel to the radio control entity.

In the serving gateway of the first communication node another routing entry is defined associating the home address of the second communication node with the established tunnel to the local data gateway. In the radio control entity another routing entry is defined associating the home address of the second communication node with the established second tunnel to the serving gateway of the first communication node.

According to another embodiment of the invention, the first communication node is attached to a relay node, and data packets to and from the first communication node are tunneled between the relay node and a relay node gateway being the serving gateway of the first communication node. The local data gateway is determined to be the gateway used by the second communication node. The relay node gateway is instructed by the management entity of the first communication node to establish a tunnel to the local data gateway.

In a further embodiment of the invention, the first communication node or the relay node transmits information to the management entity of the first communication node about the first communication node being attached to the relay node. Accordingly, the relay node gateway is determined by the management entity of the first communication node based on the received information on the relay node.

According to another embodiment of the invention, the informing of the management entity includes transmitting an access point name of the relay node to the management entity of the first communication node. Further, the determining of the relay node gateway is based on the access point name of the relay node.

For a further embodiment of the invention, the local data gateway is determined to be the gateway used by the first communication node in the foreign network, based on information on the location of the first communication node in the foreign network. The management entity of the first communication note determines a gateway of the second communication node in the foreign network, based on the identity information of the second communication node. A tunnel is established between the local data gateway and the gateway of the second communication node in the foreign network, for forwarding data packets between the local data gateway and the gateway of the second communication node.

The invention provides a communication node that exchanges data packets with a second communication node in a communications system, wherein the communication node is located in a foreign network. A transmitter of the communication node transmits a local connection request to a management entity of the communication node in the foreign network, the local connection request comprising identity information of the second communication node. The local connection request and the comprised identity information of the second communication node are used by the management entity to determine a local data gateway in the foreign network to be either a gateway of the second communication node or a gateway of the first communication node in the foreign network.

According to an advantageous embodiment of the invention, the communication node has a home IP address, further comprises a receiver for receiving from the local data gateway or the management entity IP address information on the local data gateway. A processor of the communication node configures a new local IP address for the communication node based on the IP address information on the local data gateway. The transmitter transmits data packets to the second communication node using the home IP address, and data packets to other communication nodes using the local IP address of the communication node.

According to another embodiment of the invention, the local connection request transmitted to the management entity further comprises a cell identifier of a cell to which the communication node is attached.

In an additional embodiment of the invention the communication node is attached to a relay node, and data packets to and from the communication node are tunneled between the relay node and a relay node gateway. The transmitter transmits information to the management entity of the communication node about the communication node being attached to the relay node.

The invention further provides a method for optimizing a data path along which data packets are exchanged between a first communication node and a second communication node in a communications system. At least the first communication node is located in a foreign network. The first communication node uses a local address from a local data gateway in the foreign network for exchanging the data packets with the second communication node. A route optimization agent is determined in a network to which the second communication node is currently attached. An IP tunnel is established between the first communication node and the route optimization agent. This includes establishing a security association between the first communication node and the route optimization agent based on the local address of the first communication node. All data packets are exchanged between the first and second communication nodes via the established IP tunnel over the route optimization agent by using the local address of the first communication node.

In a further embodiment of the invention, the route optimization agent is a gateway of the second communication node and the determining of the route optimization agent comprises using the domain name system for requesting a gateway of the second communication node in the foreign network According to one aspect of the invention, two communication nodes are currently communicating along a data path, wherein the first communication node uses its home address to exchange data packets with the mobile node, assuming the first communication node is currently not located in its home network. In case the first communication node is indeed in its home network, the term "home address" is to be understood as the IP address the first communication node uses in its home network.

A route optimization agent in the network of the second communication node is determined so as to provide a new shorter data path via said route optimization agent. The route optimization agent is located in the current network of the second communication node, and may be either on the data path between the two communication nodes or not. The determination of the route optimization agent can be performed by either the first communication node, some other entity on the data path between MN1 and MN2 or by more than one entity, such as a home agent of the first communication node and the communication node itself.

To said end, a "route optimization detection message" may be transmitted from the first communication node in the direction of the second communication node. Said RO detection message is then intercepted by an entity on the data path to the second communication node and triggers a response with an "RO reply message". Depending on how and by whom the determination of the route optimization agent is performed, the "RO reply message" may already contain information on a determined route optimization agent or other information that may help the first communication node to determinate a possible route optimization agent.

In order to use the route optimization agent to forward data packets between the first and second communication nodes, an IP tunnel may be established between the first communication node and the route optimization agent. To said end, the first communication node establishes a security association with the determined route optimization agent that is based on the home address of the communication node. In other words, the security association is established with the same home address, that the communication node has already configured, instead of configuring a new home address for the security association; the communication node is possibly also using the same home address for a MIP tunnel with its home agent. Consequently, the IP tunnel between the communication node and the route optimization agent is based on said home address, or with other words, the IP tunnel (e.g. the MIP tunnel) is identified by the home address.

All data packets destined to the second communication node are transmitted via the IP tunnel to the route optimization agent, which in turn forwards the packets to the first communication node. Conversely, all data packets, coming from the second communication node and destined to the first communication node are intercepted by the route optimization agent, and transmitted via the IP tunnel to the first communication node.

In the route optimization agent a routing entry is defined which associates the home address of the first communication node with the IP tunnel established with the first communication node. Therefore, data packets destined to the home address of the first communication node are forwarded over an interface of the IP tunnel to the first communication node, instead of forwarding same to the next router, according to usual routing table entries.

Furthermore, a binding cache entry in the route optimization agent associates the home address of the first communication node with the locally-dependent address of the first communication node, in case the first communication node is not located in its home network. Therefore, the route optimization agent is able to additionally encapsulate the data packet with the locally-dependent address of the first communication node as destination address.

Another routing entry in the routing optimization agent associates the address of the second communication node with the appropriate interface for reaching the second communication node. Consequently, data packets coming over the IP tunnel from the first communication node are forwarded by the route optimization agent to the second communication node.

The first communication node keeps generating the data packets for the second communication node using its home address as source address, before transmitting said data packets over the IP tunnel to the route optimization agent. Since there may be several IP tunnels bound to the same home address, the first communication node needs to select the correct IP tunnel based on the destination address of the data packet. Likewise, since the route optimization is transparent to the second communication node, the second communication node also keeps using the home address of the first communication node as the target address of its data packets.

The second communication node is not involved in the route optimization according to the present invention. Therefore, the appliance of said route optimization does not depend on whether the second communication node supports any kind of protocol. Furthermore, no air resources of the second communication node are used for said route optimization. One further advantage of the route optimization of the current invention is that the downlink and uplink direction of the data exchange is optimized, instead of only one direction as with MIPv6. In addition, since no new home address is established for the route optimization, data paths of ongoing sessions may be easily optimized without needing any further modifications in the system due to a new home address. Also, the location of MN1 is not revealed to MN2.

The invention provides a method for optimizing a data path along which data packets are exchanged between a first communication node and a second communication node in a communications system. At least one of the first and second communication node is located in a foreign network, and the first communication node supports client-based mobility and uses a home address from its home network for exchanging the data packets with the second communication node. A route optimization agent is determined in a network to which the second communication node is currently attached. Then, an IP tunnel is established between the first communication node and the route optimization agent. The IP tunnel establishment includes establishing a security association between the first communication node and the route optimization agent based on the home address of the first communication node.

As a result, all data packets are exchanged between the first and second communication nodes via the established IP tunnel over the route optimization agent by using the home address of the first communication node.

According to an advantageous embodiment of the invention, the method for optimizing is transparent to the second communication node.

According to a further embodiment of the invention, the first communication node uses its home address from its home network to perform a bootstrapping procedure with the route optimization agent for establishing the security association with the route optimization agent.

In a another embodiment of the invention a routing entry associating the home address of the first communication node with the established IP tunnel to the first communication node is defined in the route optimization agent for forwarding data packets, coming from the second communication node and destined to the home address of the first communication node, from the route optimization agent to the first communication node by using the established IP tunnel.

Relating an advantageous embodiment of the invention, the first communication node is located in a first foreign network and is assigned a locally-dependent address in said first foreign network. In said case, a binding cache entry, associating the home address of the first communication node with the locally-dependent address of the first communication node, is defined in the route optimization agent for transmitting data packets destined to the home address of the first communication node over the IP tunnel to the first communication node.

According to an advantageous embodiment of the invention, data packets received over the IP tunnel from the first communication node and destined to the second communication node are forwarded by the route optimization agent towards the second communication node based on a second routing entry in the route optimization agent.

Referring to another embodiment of the invention, the first communication node is located in a first foreign network and is connected over a mobile IP tunnel including a corresponding mobile IP security association based on the home address of the first communication node with a first home agent of the first communication node in its home network. Further, data packets are generated by the first communication node for the second communication node having the home address of the first communication node as source address and an address of the second communication node as destination address. Said data packets are then transmitted by the first communication node based on the destination address of the data packets being the address of the second communication node over the IP tunnel to the route optimization agent. Accordingly, other data packets for another communication node are transmitted by the first communication node based on the destination address not being the second communication node over the mobile IP tunnel to the first home agent of the first communication node.

In a further embodiment of the invention the second communication node is located in a second foreign network and uses network-based mobility via a mobility anchor in the home network of the second communication node. A gateway in the second foreign network receives all data packets from the second communication node, and a network-based mobility tunnel between said gateway and the mobility anchor is established for exchanging data packets between the gateway and the home agent of the second communication node. Furthermore, the gateway is determined to be the route optimization agent.

According to an advantageous embodiment of the invention, the step of determining the route optimization agent comprises determining possible route optimization agent candidates in the current network of the second communication node. Also, among the possible route optimization agent candidates that route optimization agent candidate is chosen as the route optimization agent that is on the data path between the first and second communication nodes.

Relating to another embodiment of the invention, the step of determining the route optimization agent comprises transmitting by the first communication node a route optimization detection message towards the second communication node. The route optimization detection message is intercepted by an intercepting entity on the data path between the first and second communication nodes, which determines possible route optimization agent candidates in the network to which the second communication node is currently attached. The intercepting entity transmits a route optimization reply message to the first communication entity, optionally comprising information on possible route optimization agent candidates, and information on the network to which the second communication node is currently attached.

According to another embodiment of the invention, the determined route optimization agent is not on a data path between the first and the second communication nodes. In said case, a second IP tunnel is established between an entity, that is the first router of the second communication node on the data path between the first and second communication nodes and that is in the network to which the second communication node is currently attached, and between the route optimization agent. Thus, all data packets, coming from the second communication node and destined to the first communication node, are forwarded over the second IP tunnel to the route optimization agent.

One embodiment of the present invention further provides a communication node that exchanges data packets with a second communication node in a communications system. At least one of the communication node and second communication node is located in a foreign network, and the communication node supports client-based mobility and uses a home address from its home network for exchanging the data packets with the second communication node. Furthermore, a route optimization agent is determined in a network to which the second communication node is currently attached for optimizing the data path between the communication node and the second communication node. A processor in the communication node establishes an IP tunnel with the determined route optimization agent, which includes establishing a security association with the route optimization agent based on the home address of the communication node. A receiver and transmitter of the communication node exchange all data packets between the communication node and the second communication node via the established IP tunnel over the route optimization agent by using the home address of the communication node.

In a further embodiment of the invention the processor of the communication node determines the route optimization agent in the current network of the second communication node.

According to another embodiment of the invention, the processor uses the home address of the communication node to perform a bootstrapping procedure with the route optimization agent for establishing the security association with the route optimization agent.

Referring to an advantageous embodiment of the invention, the communication node is located in a first foreign network and connected to a first home agent of the communication node in its home network via a mobile IP tunnel. Both the IP tunnel to the route optimization agent and the mobile IP tunnel and a mobile IP security association of the mobile IP tunnel are based on the home address of the first communication node.

According to a further embodiment of the invention, the processor of the communication node generates data packets for the second communication node having the home address of the communication node as source address and an address of the second communication node as destination address. The transmitter of the communication node then transmits said data packets based on the destination address of the data packets being the address of the second communication node over the IP tunnel to the route optimization agent. Conversely, the transmitter transmits other data packets for another communication node based on the destination address of the data packets not being the address of the second communication node over the mobile IP tunnel to the first home agent of the communication node.

In a further embodiment of the invention, the receiver of the communication node receives information on possible route optimization agent candidates in at least a route optimization reply message. The processor chooses among the possible route optimization agent candidates that route optimization agent candidate as the route optimization agent that is on the data path between the communication node and the second communication node. Optionally, the processor may further determine whether the establishment of the security association with the route optimization agent is possible.

With regard to more advantageous embodiment of the invention, the transmitter of the communication node transmits a route optimization detection message towards the second communication node for requesting information on the network of the second communication node and optionally information on route optimization agent candidates in the current network of the second communication node.

Referring now to another embodiment of the invention, the receiver of the communication node receives a route optimization reply message comprising the information on the current network of the second communication node and optionally the information on route optimization agent candidates. The processor of the communication node determines the route optimization agent based on said received information.

According to an advantageous embodiment of the invention, the determined route optimization agent is not on the data path between the communication node and the second communication node. In said case, the transmitter of the communication node transmits a tunnel establishment message towards the second communication node in order to establish a second IP tunnel between an entity, that is the first router of the second communication node on the data path between the communication node and the second communication node and that is in the current network of the second communication node, and between the route optimization agent. All data packets, coming from the second communication node and destined to the communication node, are thus forwarded over the second IP tunnel to the route optimization agent.

One embodiment of the invention provides a route optimization agent for optimizing a data path along which data packets are exchanged between a first communication node and a second communication node in a communications system. At least one of the first and second communication node is located in a foreign network, and the first communication node supports client-based mobility and uses a home address from its home network for exchanging the data packets with the second communication node. The route optimization agent is located in a network to which the second communication node is currently attached. A processor of the route optimization agent establishes an IP tunnel with the first communication node, which includes establishing a security association with the first communication node based on the home address of the first communication node. A receiver and transmitter in the route optimization agent exchange all data packets between the first and second communication nodes via the established IP tunnel over the route optimization agent by using the home address of the first communication node.

According to another embodiment of the invention, the home address of the first communication node is allocated at the home network of the first communication node and is topologically incorrect from the viewpoint of the route optimization agent. Still, the processor of the route optimization agent uses the topologically incorrect home address of the first communication node to establish the security association with the first communication node.

In another embodiment of the invention, the processor of the route optimization agent defines a routing entry in the route optimization agent associating the home address of the first communication node with the established IP tunnel to the first communication node. As a result, data packets, received from the second communication node and destined to the home address of the first communication node, are forwarded from the route optimization agent to the first communication node using the established IP tunnel.

With regard to another more advantageous embodiment of the invention, the first communication node is located in a first foreign network and is assigned a locally-dependent address in said first foreign network. In said case the processor of the route optimization agent defines in the route optimization agent a binding cache entry, associating the home address of the first communication node with the locally-dependent address of the first communication node. In doing so data packets, destined to the home address of the first communication node, are transmitted over the IP tunnel to the first communication node.

Referring to a different embodiment of the invention, the transmitter of the route optimization agent forwards data packets, received over the IP tunnel from the first communication node and destined to the second communication node, towards the second communication node based on a second routing entry in the route optimization agent.

In a further embodiment of the invention, the second communication node is located in second foreign network and uses network-based mobility via a mobility anchor in the home network of the second communication node. A mobile access gateway of the network-based mobility receives all data packets from the second communication node, and the route optimization agent is located in the mobile access gateway.

According to another embodiment of the invention, the route optimization agent is not located on the data path between the first and second communication nodes. In said case, the processor of the route optimization agent establishes a second IP tunnel between an entity, that is the first router of the second communication node on the data path between the first and second communication nodes and that is in the current network of the second communication node, and between the route optimization agent. Therefore, all data packets, from the second communication node and destined to the first communication node, are forwarded over the second IP tunnel to the route optimization agent.

In an advantageous embodiment of the invention, the receiver of the route optimization agent receives a route optimization detection message from the first communication node. In response to the route optimization detection message, the processor of the route optimization agent gathers information on the current network of the second communication node and optionally on possible route optimization agent candidates. Then, the transmitter may transmit a route optimization reply message to the first communication node comprising the gathered information.

One embodiment of the invention provides a packet data network gateway having home agent functionality, wherein the packet data network gateway is located on a data path along which data packets are exchanged between a first communication node and a second communication node. Further, the packet data network gateway participates in a mobility mechanism for one of the first and second communication node, and comprises a receiver that receives a route optimization detection message from the first communication node, requesting information on possible route optimization agent candidates for optimizing the data path between the first and second communication nodes. A processor of the packet data network gateway determines a route optimization agent in the current network of the second communication node. Then, a transmitter of the packet data network gateway transmits a route optimization reply message to the first communication node, including information on the determined route optimization agent.

BRIEF DESCRIPTION OF THE FIGURES

In the following the invention is described in more detail with reference to the attached figures and drawings. Similar or corresponding details in the figures are marked with the same reference numerals.

DETAILED DESCRIPTION

Definitions

Figure 1:
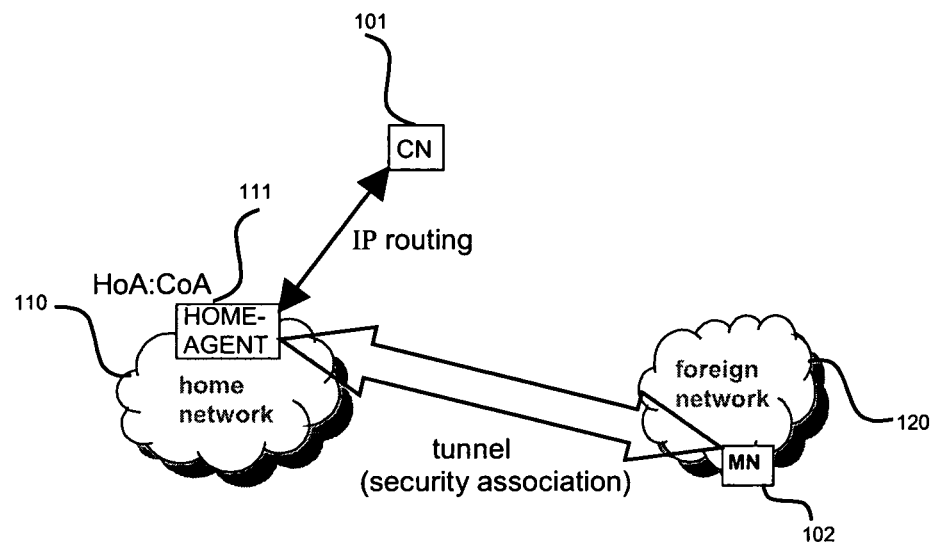
FIG. 1 exemplifies the use of bi-directional tunneling for a communication between a mobile node and a correspondent node according to MIPv6, FIG. 2 exemplifies the use of route optimization for a communication between a mobile node and a correspondent node according to MIPv6.
Figure 2:
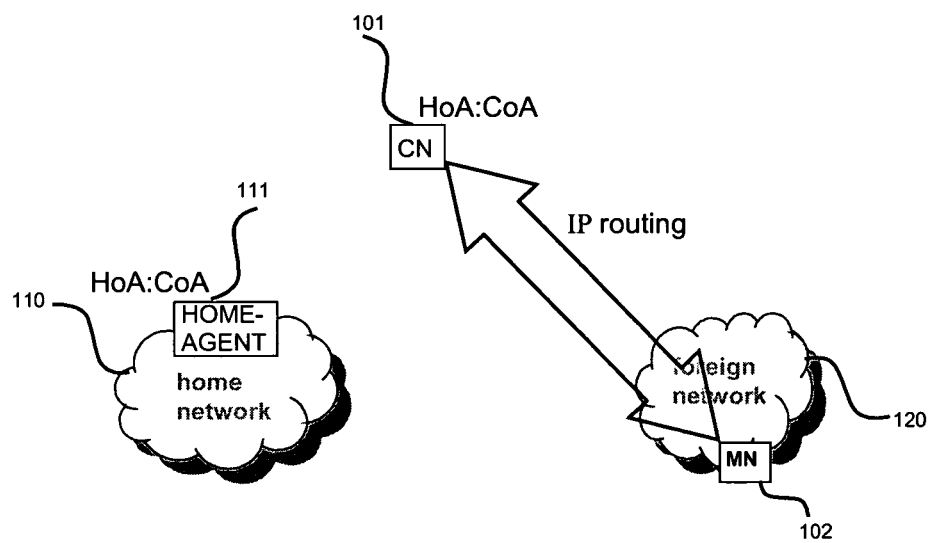
Figure 3:
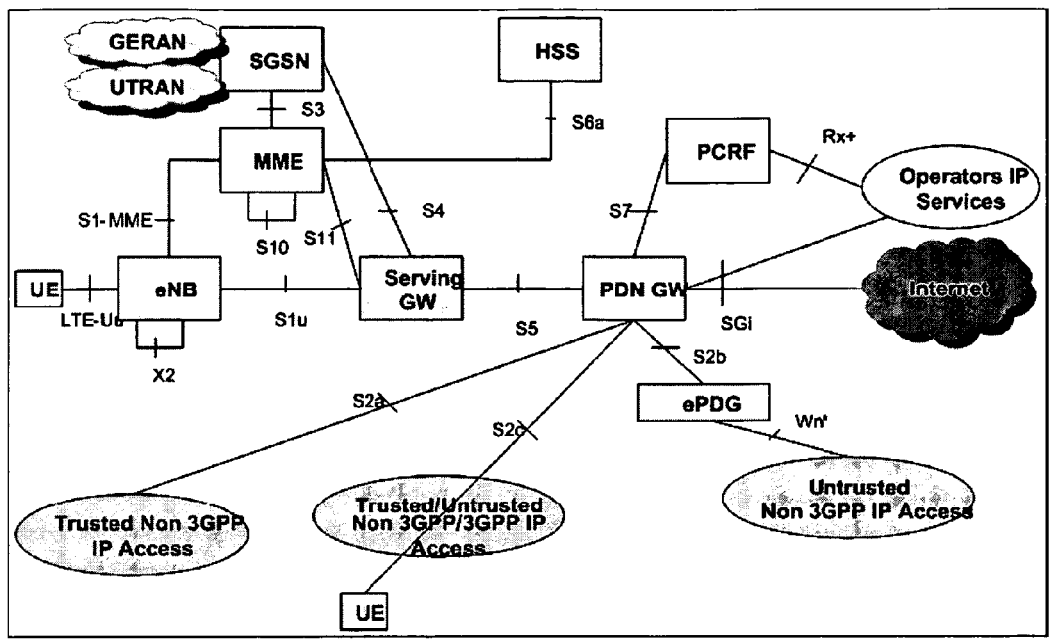
FIG. 3 illustrates the high-level architecture of an LTE system.

In the following a definition of a few terms frequently used in this document will be provided.

A mobile node is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over it may communicate with other functional entities or correspondent nodes.

A communication node may either be a mobile node, such as a mobile phone or laptop, or a fixed node, such as a server.

An IP tunnel may be defined as the additional encapsulation of a data packet with an IP header, having as corresponding source and destination addresses the IP tunnel endpoints.

A route optimization agent (ROA) may be understood as an entity or function in an entity in the network of the second communication node. It may be either located on the data path between the first and the second communication node, or not. An ROA on the data path is preferred, because no additional tunnel is then necessary between an entity on the data path and the route optimization agent outside said data path. The route optimization agent may encompass capabilities similar to an MIPv6 home agent, and additionally needs to support further functionalities, such as accepting the establishment of an IP tunnel based on a home address requested by a mobile node that is not topologically correct in the route optimization agent. For example, the route optimization agent may be located in an SGW, and may optionally also support PGW functions (co-located PGW and SGW).

A security association (SA) may be defined as a set of security information that two nodes or functional entities share in order to support secure communication. For example, a security association may include a data encryption algorithm, data encryption key(s) (e.g. a secret key or a public/private key pair, initialization vector(s), digital certificates, etc.). Typically, there is a security association provided between a mobile node in a foreign network and its home agent in the home network. Thus, even if the mobile node is attached to a foreign network, encrypted and/or authenticated/authorized communication between the home agent and the mobile node (e.g. through a secured tunnel) may be ensured. The security association is typically bound to the addresses of the endpoints, i.e. to the home agent address and the one of the mobile node's addresses (typically the home address).

A Packet Data Network (PDN) connection may be defined as the association (logical connection) between a MN (represented by one IPv4 address and/or one IPv6 prefix) and a PDN, identified by a particular Access Point name (APN). Usually, this is the association between the MN and the PDN-gateway (PGW) assigned to that particular APN.

In the following, one specific embodiment of the invention will be explained in detail. The explanations should not be understood as limiting the invention, but as a mere example of the general principles of the invention. A skilled person should be aware that the general principles of the invention as laid out in the claims can be applied to different scenarios and in ways that are not explicitly described herein.

For this specific embodiment it is assumed that the two communication nodes are mobile nodes and are currently not in their home networks but in foreign networks. It is further assumed that the first mobile node, MN1, supports and uses client-based mobility, such as MIPv6, in the VPLMN in which it is currently located. The second mobile node, MN2, uses a network-based mobility mechanism, such as PMIP, in the same VPLMN.

Figure 4:
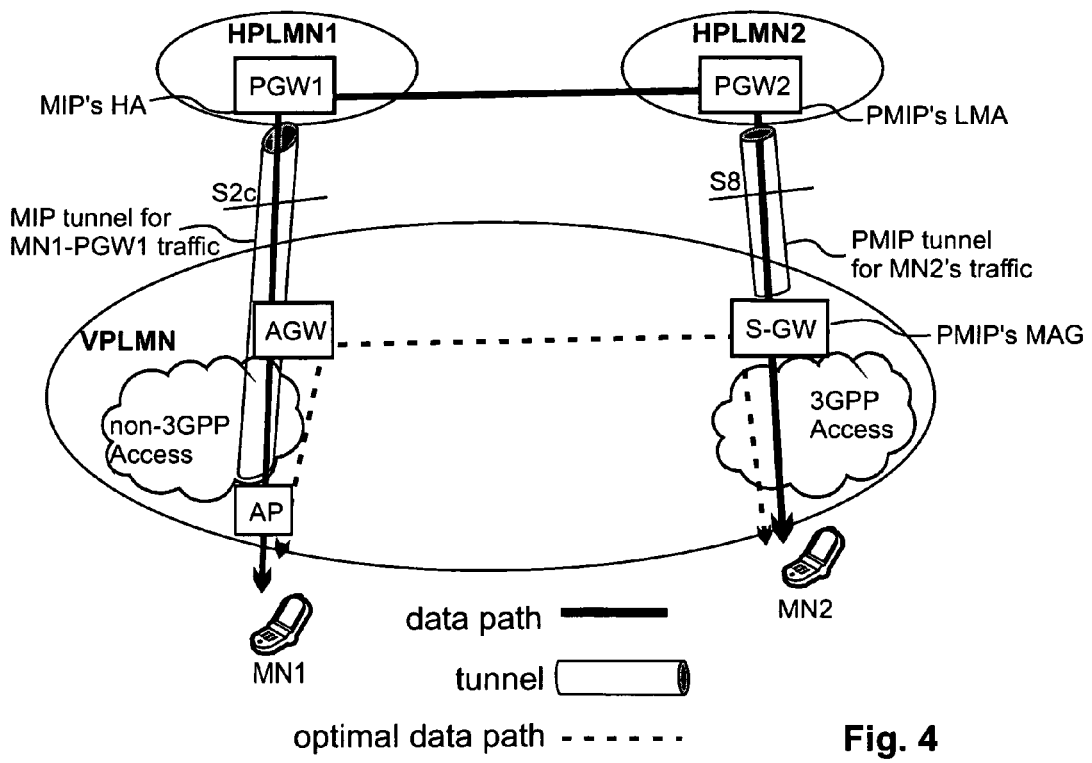
FIG. 4 illustrates an exemplary scenario where data packets are exchanged over a long data route between MN1 and MN2, an optimal data route is depicted as well.
Figure 5:
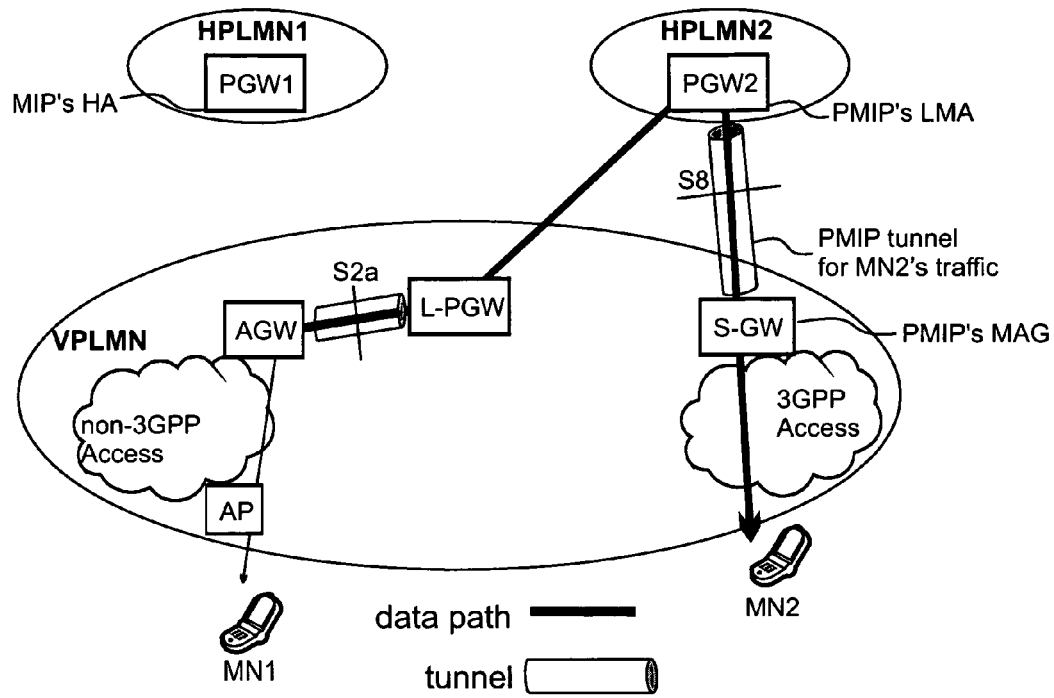
FIG. 5 illustrates the exemplary scenario of FIG. 4, and an optimized data route in case a usual MIPv6 RO is performed by the MN1, FIG. 6 again illustrates the exemplary scenario of FIG. 4, however a data path optimized according to one embodiment of the invention is depicted, and some of the corresponding messages to perform said embodiment.

This exemplary scenario has already been explained in the introduction with regard to FIG. 4. MN1 is attached through an access point (AP) to the VPLMN, and has a MIPv6 home agent PDN-GW1 (PGW1) in the MN1's home network HPLMN1. MN1 uses a HoA allocated by its home agent PGW1 to exchange data packets with other mobile nodes. Accordingly, all incoming and outward data packets are transmitted over the home agent PGW1. An access gateway (AGW) is an entity usually located in the non-3GPP access network that may participate in the authentication and IP configuration of the mobile node. According to MIPv6, an MIP tunnel is established between the MN1 and its home agent, PGW1 in HPLMN1. MN2 is attached to a 3GPP access and via a Serving Gateway to its home network HPLMN2 and its Local Mobility Agent (LMA), PGW2. According to PMIP, a PMIP tunnel is present between the Serving Gateway (SGW), which is the MN2's MAG, and MN2's LMA, PGW2, over which the data packets are transmitted.

The MIP tunnel and the PMIP tunnel have been established as part of the MIP respectively PMIP mobility protocol. According to the present invention, these tunnels may be further used for communication with other mobile nodes, different to MN1 and MN2.

Figure 6:
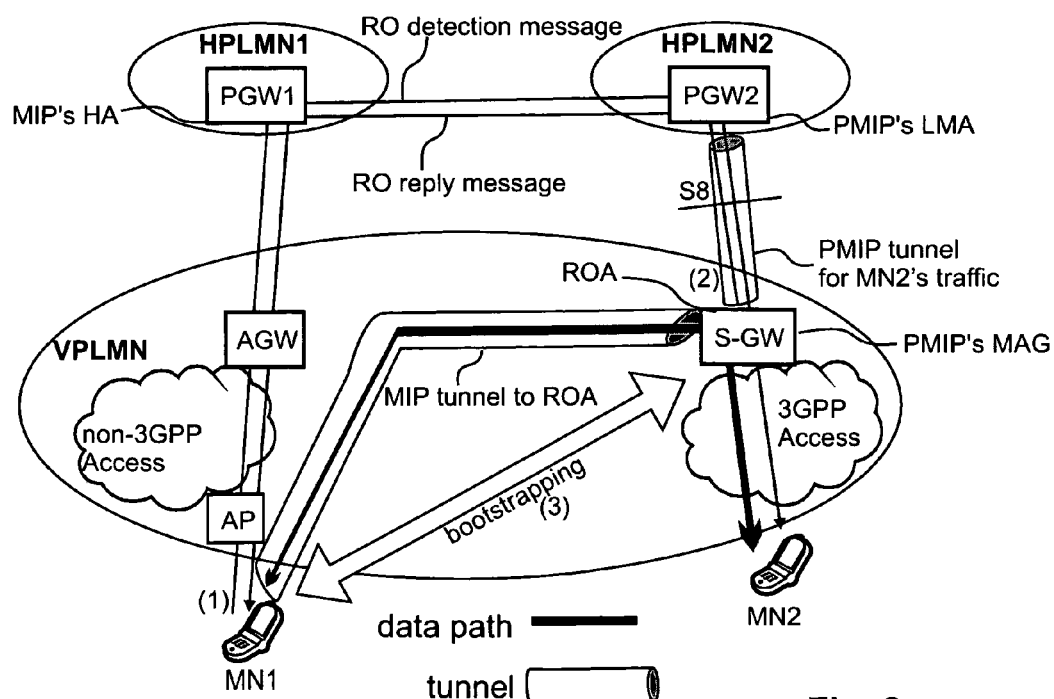

FIG. 6 depicts an optimized data path between MN1 and MN2 according to the route optimization of the present invention. The various steps that are to be performed to arrive at the optimized data path will be explained in the following.

It is assumed that MN1 initiates and performs the route optimization and MN2 is not aware of the route optimization. According to the RO solution of the present invention, after the MN1-initiated route optimization procedure is completed, the route optimization is set up in both directions, i.e. from MN1 to MN2 and from MN2 to MN1. The solution does not require the involvement of the MN2 in the route optimization procedure, and thus, the proposed solution is applicable to all types of correspondent nodes.

As will become apparent below, MN1 supports client-based mobility such as MIPv6 that it is currently using with its home network HPLMN1. The MN1 that initiates the inventive route optimization usually does not know the current location of MN2, but merely the HoA of the MN2. Therefore, MN1 does not know whether MN2 is in its home network, HPLMN2, or in a visited PLMN. According to the current exemplary scenario, MN2 is located in the same PLMN as MN1. Naturally, MN2 may instead be located in a different foreign network.

MN1 first decides on whether a RO is actually necessary or not. For instance, the MN1 may be located in its home network HPLMN1, and MN2 may also be located in its home network, HPLMN2 (this case is not shown in the figures). In said case, no route optimization is necessary since the data path is already optimal. However, if MN2 is not located in its home network, but in a foreign network, MN1 may decide to perform a route optimization so as to avoid the detour over MN2's home network. The route optimization of the present invention may also be applied in case MN2 does not support any other route optimization, e.g. from MIPv6. In general, at least one of MN1 or MN2 should be located in a foreign network for a RO to be beneficial.

Alternatively, the decision on whether to perform the route optimization of the present invention may not be taken by the MN1 but instead by another appropriate entity on the data path between MN1 and MN2, such as MN1's home agent PGW1 or more probable MN2's home agent PGW2, that is aware of MN2 and its current network. In said case, the MN1 may be merely informed of the decision taken and will act accordingly.

In the scenario of FIG. 6, MN1 learns that MN2 is located in the same foreign network as itself and will thus decide to perform the route optimization. In the beginning, it is necessary to determine a route optimization agent (ROA) which will be used for the new optimized data path. Advantageously, the ROA is located on the data path between MN1 and MN2; however, as will be explained in more detail later, it may also be possible to use a ROA that is not on said data path, but merely in the same network as MN2. In said case, the data packets coming from MN2 need to be routed from the data path to the ROA first, so as to make sure that all data packets coming from MN2 and destined to MN1 are received by the ROA, which in turn then forwards said data packets to MN1.

In the exemplary scenario of FIG. 6, the Serving Gateway (SGW) in VPLMN is chosen as route optimization agent. To choose a ROA, the entity which determines the ROA, which may be the MN1, requests information on suitable ROA candidates in the MN2's network. A ROA need to have special properties to act as intermediary for the new optimized data path. Amongst other things, it is advantageous that the ROA has capabilities of a MIP home agent, e.g. so as to establish a tunnel between the ROA and MN1. Further functionalities may be supported by the ROA as will be explained further on.

It is assumed that the tunnel between the ROA and MN1. To establish the tunnel between the ROA and MN1 is based on the IPsec protocol as specified for MIPv6, MN1 performs a bootstrap procedure with the ROA, thus first acquiring the ROA address and then set up a security association with the ROA. During the security association establishment the MN1 requests the use of its already configured home address from its home network HPLMN1. In other words, the old MN1's home address is used for the security association with the ROA, instead of configuring a new home address with the ROA, which usually is a topologically correct IP address for the ROA. Correspondingly, data packets may then be tunneled in both directions between the ROA and MN1. After the security association is completed the MN1 sends a binding updated message to the ROA to register its current CoA, e.g. the IP address used in the current non-3GPP access system.

It should be noted for a skilled person that the tunnel between MN1 and ROA may be generated and maintained by another protocol, different from IPsec within MIPv6. For instance, there is MIPv4 which also supports IPsec, or IKEv2 Mobility and Multihoming Protocol (MOBIKE), or other tunneling protocol between a client and a network gateways.

In any case, in order to tunnel the data packets, they are encapsulated with a header at the ROA and MN1, the header comprising the tunnel endpoints as source and destination addresses. Optionally, the original data packet (the payload of the tunneled data packet) may be encrypted, e.g when using the IPsec protocol in tunnel mode.

According to some embodiments of the present invention, the route optimization is transparent for the MN2, i.e. the MN2 does not participate in and is not aware of the route optimization. Therefore, the MN2 keeps transmitting data packets destined to the MN1's HoA, and expects data packets from the MN1 to have the MN1's HoA as source address. The MN1's HoA is thus further used for exchanging the data packets between MN1 and MN2.

To enable the optimized data path, a special routing entry is defined in the ROA that associates MN1's home address with the interface that corresponds to the established IP tunnel to MN1. Therefore, all data packets arriving at the ROA from the MN2 having the MN1's HoA from HPLMN1 in the destination address field are forwarded to said tunnel interface. In order to construct the outer header for tunneling, a binding cache entry is also established in the ROA, that associates the MN1's HoA with the MN1's CoA in the VPLMN. Correspondingly, the destination address field of the outer tunnel header comprises the MN1's CoA, while the destination address field of the inner header comprises the MN1's HoA; the source address of the outer header is the ROA address. The MN1 receives the data packets, decapsulates them and processes the enclosed payload.

Data packets from MN1 and destined to MN2, are forwarded by the ROA to the MN2 according to a routing entry established therein. In case the ROA is on the original data path between MN1 and MN2, said routing entry may already be configured. If the ROA is outside the original data path, then said routing entry needs to be established, possibly together with a binding cache entry (will be explained later).

Consequently, an optimized data path is established between MN1 and MN2, avoiding the detours over the home networks of the communicating mobile nodes.

In the following each step for establishing the optimized data path according to the embodiments of the present invention will be explained in greater detail. Three main stages may be differentiated. At first, the "route optimization detection" determines whether the data path is to be optimized and if that is the case, determines a route optimization agent over which the optimized data path should go. Subsequently, it is necessary to set up the new data path, which includes the establishment of a tunnel between MN1 and the ROA, and the necessary routing entries and binding cache entries in the ROA and MN1. Finally, the actual data exchange will be explained more thoroughly, compared to a data exchange with another mobile node, to which the route optimization of the present invention is not applied.

"Route Optimization Detection"

The RO detection procedure may have the following purposes:
1) to detect whether a route optimization between MN1 and MN2 is beneficial,
2) if a route optimization is beneficial, then to detect which type of RO shall be performed. For instance, the route optimization according to the present invention can be performed per default. However, in some cases a usual MIPv6-based RO may be performed instead.
3) in case the route optimization of the present invention is to be performed, to discover a route optimization agent and learn its ID. The ROA-ID can be an IP address or a Fully Qualified Domain Name (FQDN) that uniquely identifies the ROA.

At the beginning, MN1 transmits a "RO detection message" in the direction of the MN2, so as to detect the necessity of RO. The reply to the "RO detection message" will give the MN1 appropriate information to decide on whether a RO is advantageous.

For example, the MN1 may decide based on the information gathered through the RO reply message, that a route optimization is not advantageous. This may be the case, if MN1 is located in its home network HPLMN1, and learns that MN2 is in its home network HPLMN2 as well. Since there is already an optimal path between the two mobile nodes, a further route optimization would not be beneficial.

Though the route optimization of the present invention should be performed, there might be cases in which a usual MIPv6 RO is more appropriate. For instance, in case MN2 also uses a client-based mobility protocol, such as MIPv6, the two mobile nodes may each perform a MIPv6 RO to achieve an optimized data route.

If the MN1 learns by the RO detection procedure that MN2 is attached to the same VPLMN, where the MN1 is currently located, then the route optimization of the present invention is preferable.

The "RO detection message" could be implemented in different ways and additionally may e.g. perform the role of a "ROA discover" message, i.e. there is no need to perform an additional ROA discovery procedure as done in the usual MIPv6 bootstrapping protocol. Such a "RO detection message" can be sent by MN1 over the original data path to MN2 (including existing MIP tunnels), i.e. the "RO detection message" traverses the PGW1 and PGW2. In general, any routing or mobility anchor entity (like LMA, MAG or HA) on the data path between MN1 and MN2 can reply to the "RO detection message" with a "RO reply message". Note that the RO reply message may contain information for the ROA discovery. The sender of the "RO reply message" may include RO-related information that can indicate to the MN1 whether RO can be beneficial and optionally which RO should be performed. This information may e.g. include the information on which PLMN MN2 is currently attached to.

One possible way to realize the "RO detection message" is to use a slightly modified HoTi or CoTi message. If the MN1 uses a modified HoTi message as "RO detection message", the MN1 may delay the sending of a CoTi message in order to first detect which type of RO is needed or whether RO is needed at all. Then, in case a usual MIPv6 RO is to be performed instead of the route optimization of the current invention, MN1 may continue the return routability procedure by transmitting the CoTi message.

The "RO detection message" can be discarded by the sender of the reply, but can also be forwarded further to the final destination, which is the MN2. For instance, if the SGW forwards the RO detection message further to the MN2, MN2 may either discard the message because e.g. the MN2 does not implement a MIPv6 stack to respond to the HoTi message, or it may reply, e.g. if it can interpret the message. If the MN1 receives several "RO reply message", even from the MN2, the MN1 can implement means to decide which RO type to initiate.

Another option would be that a special new message is defined to fulfil the purpose of the "RO detection message". Yet another option for the realization of the "RO detection message" would be a data packet with a new IP header option or with a new flag, e.g. a "ROA" flag, in the IP header. Then, the routers or mobility anchors on the data path between MN1 and MN2 may generate a reply to the MN1 in response to that new IP header or new flag.

The RO detection message may be intercepted by various entities on the data path between MN1 and MN2 as already described before. Another possibility is that only that entity with home agent functionality replies to the RO detection message from MN1 that has a binding cache entry (BCE) for MN2. Since the destination address of the "RO detection message" is the MN2's IP address, any entity may easily detect whether it has a BCE for that MN2 or not.

The "RO detection message" may contain the "source PLMN ID" (e.g. HPLMN1) or "source node ID" (e.g. the Network Access Identifier, NAI, which is submitted by the user as its identity during network authentication as described in RFC 4282) from which the replying entity may deduce whether a roaming agreement between the MN1's HPLMN1 and the PLMN where the ROA is located is existent. A roaming agreement between the network where the route optimization agent is attached and the home network of MN1 is necessary to establish the security association between the ROA and MN1 for the tunnel establishment, as will be explained later. The replying entity may thus decide if a routing optimization according to the present invention is possible.

If PGW2 receives the "RO detection message" and detects based on the "HPLMN ID" that there is no roaming agreement between VPLMN and HPLMN1 (i.e. UE1 cannot bootstrap with SGW), but the PGW2 does not know whether there is a roaming agreement between HPLMN1 and VPLMN. If by network configuration the inventive RO is not allowed for MN2, the PGW2 may decide to discard the "RO detection message". Otherwise if the RO is allowed for MN2, the PGW2 has 2 possibilities: 1) PGW2 does not reply and forwards the "RO detection message" further, or 2) PGW2 sends "RO reply message" including the SGW ID (and corresponding VPLMN ID). If the PGW2 forwards the "RO detection message" and the SGW in VPLMN receives it, the SGW may decide whether to reply based on the roaming agreement, too.

The RO detection message may also contain the MN1's current VPLMN ID in order to determine by the PGW2 or some other entity on the data path whether RO between MN1 and MN2 could be beneficial.

In general, the information contained in the RO detection message depends on which entity determines the necessity of a RO and the routing optimization agent. For instance, if all decisions are taken by MN1 (may be denoted as MN-centric decision), the RO detection message may only contain information necessary for the replying entity to gather all information on MN2, MN2's current network and possible ROA candidates and to generate an RO reply message containing all said information, which is then transmitted back to MN1.

Conversely, if any other entity, such as the PGW2, is to take the decisions (may be denoted as PGW2-centric decision), the RO detection message should contain the information necessary for the PGW2 to take said decisions, such as to the MN1's home network HPLMN1.

If MN1 decides to perform the RO according to one embodiment of the present invention, MN1 may also search for a route optimization agent. For instance, when the RO detection message is received by the replying entity (e.g. PGW2), said entity not only acquires information for deciding whether a route optimization is actually beneficial. In addition, the replying entity may search for a suitable route optimization agent(s) in the network where MN2 is currently attached. In case the SGW is the replying entity, the SGW knows that itself may perform the functions of a route optimization agent and includes said information in the RO reply message. Other possible route optimization agent candidates may be known to the SGW. Alternatively, every possible route optimization agent that receives the RO detection message may respond separately with an RO reply message, so as to inform the MN1 that it is available as route optimization agent.

Depending on whether the MN1 is to take the decisions or not, the "RO reply message" transmitted by an entity on the data path between MN1 and MN2 in response to the "RO detection message" may contain the PLMN ID where the MN2 is located. Correspondingly, the MN1 may then decide on whether a RO is beneficial, and which RO is to be performed.

Furthermore, the RO reply message may already contain the identity of a route optimization agent, that was determined by another entity on the data path between MN1 and MN2, such as the PGW2. Alternatively, the MN1 may receive through one or more RO reply messages several ROA candidate IDs from which the MN1 must determine one to be the route optimization agent.

In correspondence to the RO detection message being a modified HoTi or CoTi message, the RO reply message may be implemented as a modified HoT or CoT message.

If the MN2 is using network-based mobility, such as PMIPv6, it is important to note that the local HA is advantageously collocated with the entity performing the MAG function; in the described scenario, the SGW. It should also be noted that the term SGW is specifically applicable to the 3GPP's LTE architecture. However, the current invention is not limited only to the LTE architecture, but is applicable to other networks. In those cases the SGW represents the first (or default) router for the MN2.

From the above explanation, it should be obvious to a skilled person that there are various ways to determine whether and which route optimization is to be performed, and to determine a route optimization agent. The above mentioned embodiments of the invention are mere examples, and can be varied and combined in different ways. In any case, the MN1 needs to know the identity of an ROA in order to establish a tunnel with the ROA.

Figure 7:
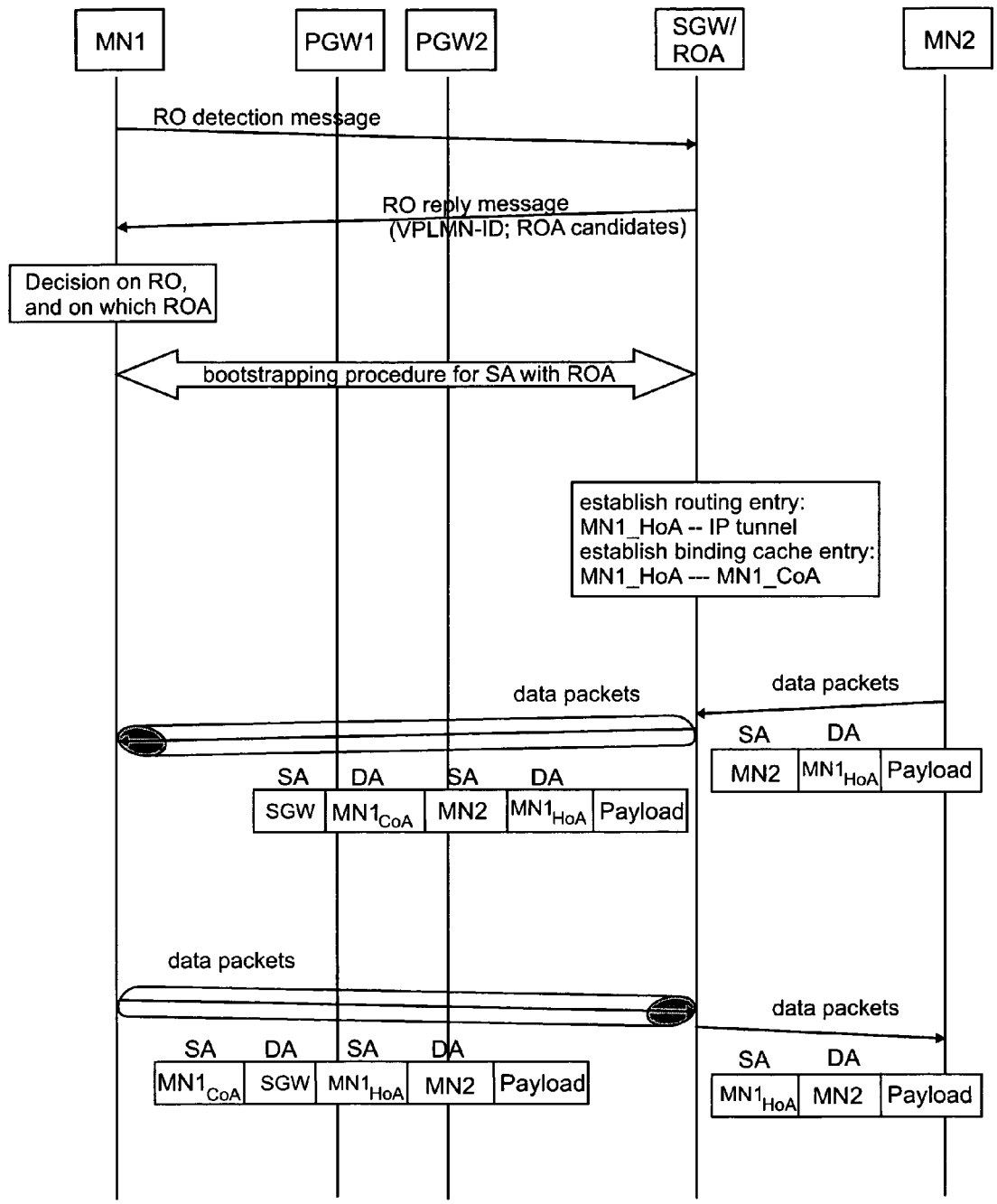
FIG. 7 is a signaling diagram illustrating the signaling for the route optimization according to one embodiment of the present invention and the resulting data exchange over the thus optimized data path.

In FIGS. 6 and 7 the transmissions of the RO detection message and the RO reply message are illustrated according to the exemplary scenario previously described. It should be assumed for the ease of the following explanation that MN1 takes the decisions as to the necessity of route optimization and as to the route optimization agent which will be used.

MN1 transmits the RO detection message (1), which is forwarded via the PGW1, PGW2 and SGW to the MN2. As already mentioned, the RO detection message can be implemented as an extended HoTi message, which may optionally include the MN1's HPLMN and/or VPLMN as described above. Consequently, the home agents (or LMAs) PGW1 and PGW2 would just forward the extended HoTi towards MN2. It is further assumed in this exemplary scenario that the SGW intercepts the RO detection message. In response thereto, the SGW collects information on the network to which MN2 is currently attached (VPLMN-ID), and includes its own identity as a possible ROA candidate in the RO reply message. The SGW sends the corresponding RO reply message (2), including said information, to the MN1. In this case, the RO reply message is implemented as an extended HoT message.

MN1 receives the RO reply message and the enclosed information, and thus learns that MN2 is located in the same VPLMN as itself. Consequently, MN1 determines that a route optimization would be beneficial. According to the VPLMN1-ID, MN1 may also determine whether there is a roaming agreement between VPLMN (the network where the ROA and MN2 are located) and HPLMN1. To establish a security association between an ROA in VPLMN and MN1, the ROA needs to authenticate MN1 via MN1's home network HPLMN1 and the appropriate authentication service provided by HPLMN1. If there is no roaming agreement between VPLMN and HPLMN1, ROA is not able to authenticate MN1 and thus no security association can be established between MN1 and a possible ROA in said network. For said case, the MN1 may determine that a route optimization according to the present invention is not possible.

It is assumed that a roaming agreement has been established between VPLMN and HPLMN1 so that later on MN1 can generate a security association with the determined ROA.

MN1 needs to determine a route optimization agent in the MN2's network. The RO reply message may contain information on one or a plurality of possible ROA candidates. Alternatively or in addition, MN1 may have received several RO reply messages from different entities on the data path between MN1 and MN2. For instance, each entity that can act as a ROA and receives the RO detection message may respond with a RO reply message, identifying itself as a possible ROA candidate. In general, the ROA candidate(s) may be on the data path or not, as long as they are located in the MN2's network.

If no candidate has been identified to the MN1 in the RO reply messages, because no entity on the data path is able to act as ROA, the MN1 may perform a known home agent discovery mechanism, by which all possible home agents in a particular network are determined. MN1 may then select one among those identified home agents to be the route optimization agent, provided that the selected home agent supports the necessary functionality to be a ROA according to the present invention.

Advantageously, MN1 determines a ROA on the data path between MN1 and MN2. In any case, at the end of the RO detection procedure the MN1 should know the identity of a ROA in the MN2's network.

In the previous description it is assumed that MN1 knows its current VPLMN-ID and includes it in the "RO detection message" in order to assist the network entities on the data path to take decision about the necessity of RO. IT is however not necessary that the MN1 knows the VPLMN-ID, and a problem could arise how MN1 learns its current PLMN ID. One possible solution is that the PGW1 inserts the VPLMN ID in the RO reply message. The problem can boil down to a case where the PGW1 may also not know the MN1's current VPLMN ID. One simple solution would be to allow the AGW to insert the information about the VPLMN ID. However, since the RO detection/reply messages are tunneled in the MIP tunnel, they are transparent for the AGW. Therefore, one workaround is that the MN1 sets up a special flag in the outer MIPv6 tunnel IP header as indication for the AGW to inspect the message and to insert the VPLMN ID in the corresponding field in the RO detection message.

One possible problem with the introduction of the "RO detection message" is that a malicious node (for instance MN1) can perform a Denial of Service (DOS) attack. In such an attack, the MN1 can send millions of RO detection messages and can cause increased processing in the entities (HAs, PGWs, SGWs) where the correspondent nodes are attached. A possible solution could be that PGW2 (being the mobility anchor point for MN2) may apply a rate limitation for the "RO detection messages" sent to the destination address of MN2, e.g. 1 msg per MN per second or per minute. In this way the "RO detection messages" would not be flooded in the HPLMN2 and possible VPLMNs where MN2 is attached.

Optimized Data Path Establishment

Using the ROA-ID (which may be the ROA IP address or a FQDN), MN1 needs to establish an IP tunnel with the determined ROA, and to said end starts a bootstrapping procedure to establish a security association with the ROA and optionally to get the ROA address if necessary (see FIG. 7). Before starting with the bootstrapping procedure, the MN1 may verify that the discovered ROA is located in the access network, where the MN2 is currently located. MN1 does not request a new home address from the ROA, but uses its already configured home address from HPLMN1 to establish the security association with the ROA. Therefore, an IPsec tunnel is established between ROA and MN1 that is bound to MN1's HoA allocated in HPLMN1.

A routing entry in the MN1 is necessary so as to associate data packets with MN2's address in the destination address field to the MIP tunnel towards the ROA. The reason is that the MIP tunnel to the ROA is established based on the same HoA that the MIP tunnel to PGW1 is bound to. To differentiate between both tunnels, the routing entry in the MN1 decides based on the destination address over which MIP tunnel a particular data packet is to be transmitted.

Though the MN1's original HoA is not topologically correct for the ROA, the ROA still needs to establish said special routing entry for the data packets coming from MN2 to MN1, the special routing entry associating the MN1's HoA with the established tunnel. In more detail, according to the usual routing function of a router, data packets with the MN1's HoA as destination address would be routed to the next router according the routing table entries, i.e. the packets would not be processed locally. Usually the data packets are only processed by a HA function in a router, if the IP prefix of the destination address is hosted by the router/HA itself. In this case however, the ROA should pass the data packets to its HA function in order to transmit the data packets destined to the MN1's HoA that is not allocated at the ROA, over the IP tunnel to MN1. Therefore, the entity on which the ROA function is running, must have a routing entry indicating that packets destined to the MN1's HoA address are not to be processed by the router function, but must be processed by the HA function, although the IP prefix of the destination address is not hosted by the ROA.

As can be seen in FIG. 7, a binding cache entry is also established in the ROA for associating the MN1's HoA with the MN1's CoA. Therefore, the HA function may apply the binding cache entry for using the MN1's CoA in tunneling data packets, from MN2 and destined to the MN1's HoA, to the MN1.

Furthermore, a further routing entry is already configured in the SGW/ROA for data packets destined to MN2, associating MN2's address with the interface for reaching the MN2. This routing entry was initially establish for PMIP so that data packets that are received over the PMIP tunnel from PGW2 and decapsulated, may be further forwarded to the MN2. This routing entry may also be applied to data packets that are received over the IPsec tunnel from MN1, since the same destination address is present in the data packets after decapsulation. Therefore, no routing entry needs to be additionally established in the ROA for data packets arriving from MN1 over the optimized data path.

The above elaboration assumes that the ROA is located on the data path between MN1 and MN2 and thus receives all data packets from MN2. However, as already set out, the ROA does not need to be on the data path. In said case however, it is necessary to make sure that all data packets from MN2 to MN1 are transmitted over the ROA. To achieve this, all data packets destined to MN1 must be tunneled between the MN2's first (default) router to the ROA.

Figure 8:
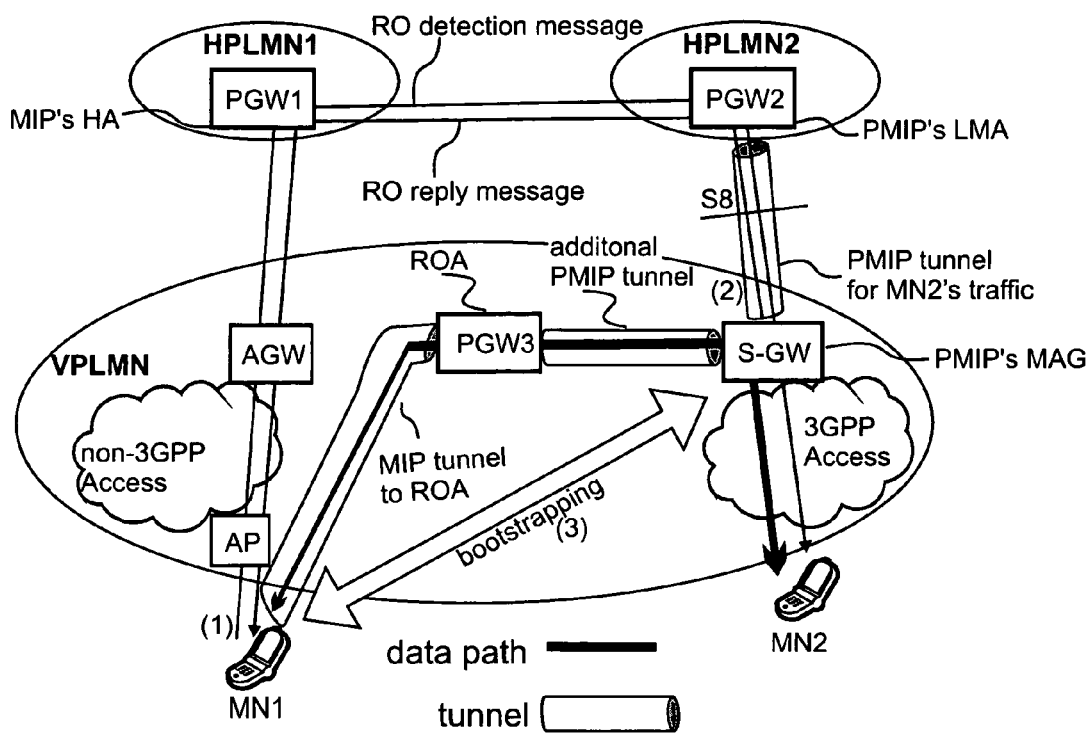
FIG. 8 illustrates the network deployment in FIG. 4, in case a different embodiment of the invention is applied, in particular, in case the route optimization agent is not located on the original data path between MN1 and MN2.

FIG. 8 illustrates the case where the ROA is not on the data path between MN1 and MN2, but in a PGW3 located somewhere in the VPLMN. The optimized data path goes via the ROA and the first router of MN2, the SGW. After determining PGW3 as ROA, the MN1 starts a bootstrapping procedure with PGW3 to establish a security association and thus establishes an IPsec tunnel between MN1 and PGW3. As before, the already configured MN1's HoA from HPLMN1 is used for generating the security association with the ROA. Furthermore, similar to the case where the ROA is in the SGW, a special routing entry needs to be established in the ROA associating the MN1's HoA with the tunnel interface to the MN1 for forwarding data packets from MN2 and destined to MN1's HoA over the MIP tunnel directly to MN1. A binding cache entry in the ROA associating MN1's HoA with MN1's CoA allows a HA function of the ROA to generate the tunnel encapsulation, i.e. include the MN1's CoA as destination address of the outer tunnel header.

As already set out, it is necessary to establish a tunnel between SGW and ROA. To said end, MN1 may transmit a special message, including the PGW3-ID to MN2. This special message may be for example a "HA discover message" similar to the one described before in connection with the search for a possible ROA, in case no ROA candidate replied with a RO reply message. For example, the MN2's anchor point (e.g. in this case PGW2) or the SGW, may intercept the special message, and thus learns that the MN1 has configured a ROA. Accordingly, PGW2 triggers MN2's SGW to establish a PMIP tunnel to the PGW3/ROA.

The PMIP tunnel is set up between SGW and PGW3/ROA. Differently to the case where the ROA is the SGW, it is necessary to configure a routing entry in the ROA for data packets coming from MN1 and destined to MN2. The routing entry associates the MN2's address with the PMIP tunnel interface to the SGW. This allows the ROA to build the outer tunnel header for tunneling the data packets to the SGW.

Furthermore, a routing entry and a corresponding binding cache entry need to be established in the SGW for routing data packets having as destination address the MN1's HoA over the PMIP tunnel to the PGW3.

Another possible procedure for the establishment of the PMIP tunnel between PGW3 and MN2's SGW is performed as follows. If the MN1 knows the MN2's SGW ID (for instance the SGW-ID may be included in the RO reply message), the MN1 can signal this ID to the PGW3 during the bootstrapping procedure for establishment of the MIPv6 tunnel between MN1 and PGW3/ROA. Then, the PGW3 may contact the SGW2 (or the another mobility management entity (MME) in the core network) to initiate the establishment of a PMIP tunnel between the SGW2 and PGW3 for the data traffic between MN1 and MN2.

It may be advantageous to establish the PMIP tunnel before the completion of the bootstrapping procedure because immediately after the successful bootstrapping, the MN1 can start sending data packets to the PGW3, and the PGW3 should have an established routing entry for forwarding the data packets over the PMIP tunnel to the SGW and not routing same to PGW2, where the MN2's IP prefix is hosted.

In this way, an optimized data path is achieved, though the ROA is not on the original data path between MN1 and MN2.

Up to here it is assumed that the network-based mobility is based on the PMIPv6 protocol. However, the present invention is not limited to the PMIPv6 protocol, and therefore, other protocols like GTP can be applied between the PGW3/PGW2 and the SGW.

Data Exchange Details

FIG. 7 depicts in the lower part the header structure for data packets exchanged between MN1 and MN2 after the route optimization according to the explained embodiment of the invention is performed.

MN2 generates a data packet with a corresponding header having the MN2's address as source address and the MN1's HoA as destination address. The data packet is transmitted to the first router, which is the SGW and in this scenario the ROA as well. According to the routing entry and the corresponding binding cache entry, the data packet is encapsulated with another header, where the SGW's address is the source address and the MN1's CoA is the destination address of the outer header. The data packet is thus forwarded to the MN1 which decapsulates the data packet and may further process same.

MN2 may have further sessions with other mobile nodes. Those data packets have as destination address not the MN1's HoA, but other addresses. Thus, they are not forwarded via the MIP tunnel to the MN1, but over the PMIP tunnel to PGW2. In other words, the special routing entry previously established is only applicable to data packets that have the MN1's HoA as destination address.

MN1 generates a data packet with a corresponding header that comprises the MN1's HoA in the source address field and the MN2's address in the destination field. Usually, MN1 selects according to the source address field of a data packet over which MIP tunnel said data packet is transmitted, since every MIP tunnel is usually based on a different home address. However, in this case two MIP tunnels are present in MN1 that are based on the same home address of MN1; one to its home agent, PGW1 in HPLMN and the other tunnel goes to the ROA in the VPLMN. Therefore, the MN needs a routing entry that directs data packets with the MN2's address as destination address to the MIP tunnel towards the ROA. A corresponding binding cache entry allows the MN1 to construct the outer header which has the MN1's CoA as source address and ROA's address as destination address.

The data packet is thus transmitted over the appropriate MIP tunnel to the ROA, which decapsulates the data packet. The ROA forwards the decapsulated data packet to the MN2 according to a routing entry that associates the MN2's address in the destination address field of the data packet with the appropriate interface towards MN2.

MN1 may have further sessions with other mobile nodes. However, since the destination address is not the MN2's address, the special routing entry in the MN1 does not apply, and the data packets are transmitted over the MIP tunnel towards PGW1 in HPLMN1.

Figure 9:
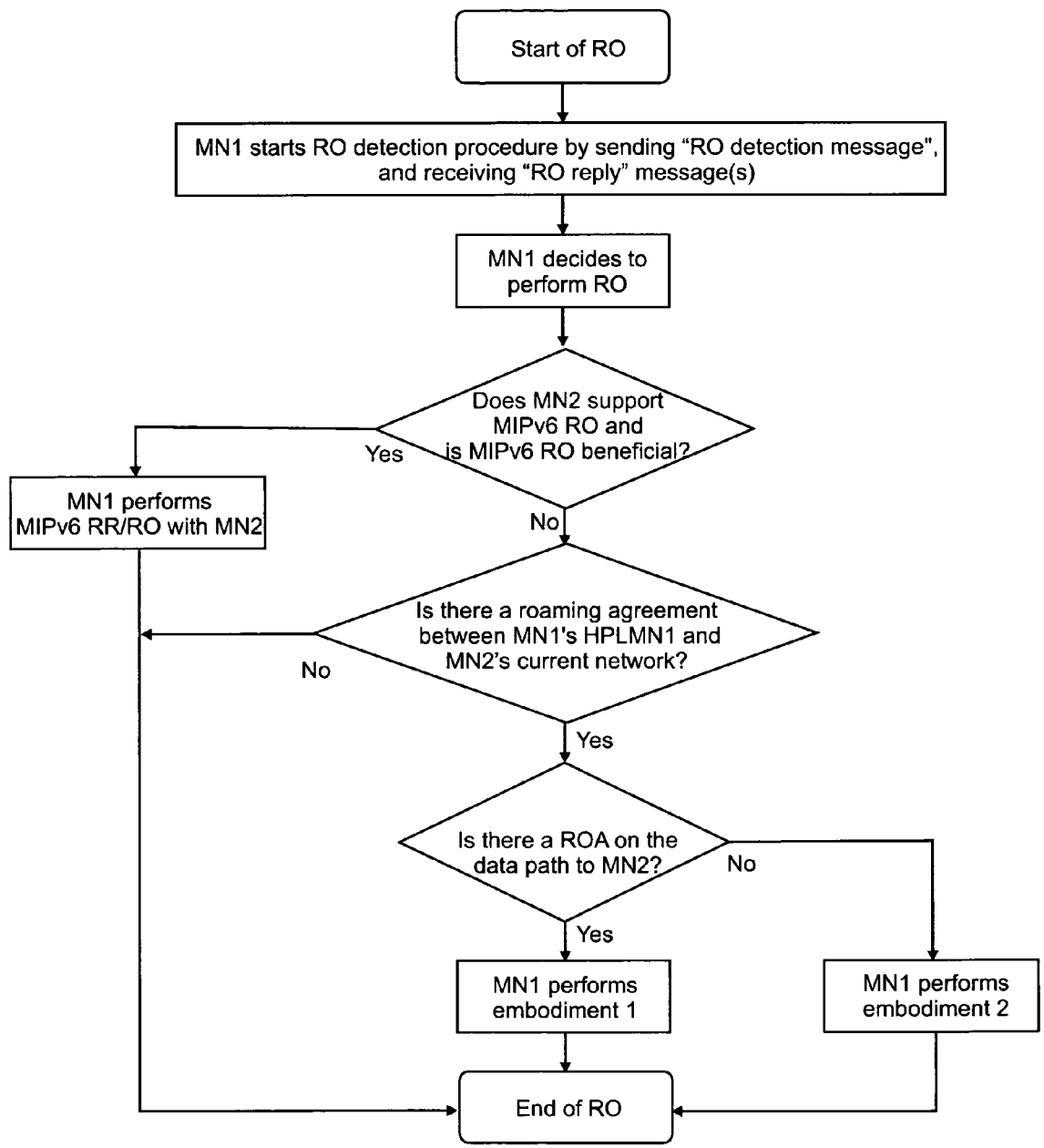
FIG. 9 shows a flow diagram illustrating some of the steps performed by the MN1 in accordance with some embodiments of the invention.

FIG. 9 discloses a flow diagram illustrating some of the steps that are to be taken by the MN1 for performing the RO according to several embodiments of the present invention. MN1 starts the RO detection procedure by transmitting a "RO detection message" to the MN2. The MN1 receives the RO reply message(s) and extracts the enclosed information, which may include e.g. the MN2's current network (VPLMN-ID) and/or possible ROA candidates. MN1 is thus able to decide on whether to perform a route optimization or not.

It is assumed that a RO shall be performed, in which case the MN1 determines whether MN2 supports MIPv6 and if yes whether MIPv6 RO is indeed beneficial over the route optimization according to the present invention.

If MIPv6 is supported and MIPv6 RO is beneficial, MN1 performs a MIPv6 RR/RO procedure with MN2. Conversely, it is necessary to determine whether a roaming agreement exists between the MN2's VPLMN and MN1's home network, HPLMN1. If no roaming agreement exists, no route optimization according to the present invention is performed.

If a roaming agreement is available, a route optimization agent is determined, and in particular, whether a route optimization agent on the data path between MN1 and MN2 is possible.

Depending on whether the determined ROA is on said data path or not, two different embodiments of the invention are performed. The first embodiment refers to the scenario as described with reference to FIGS. 6 and 7, in which the ROA is on the data path. The second embodiment refers to the scenario as described with regard to FIG. 8, where the ROA is outside the original data path in PGW3, and an additional tunnel between SGW and ROA is necessary. Thus a new optimized data path is established between MN1 and MN2.

Figure 10:
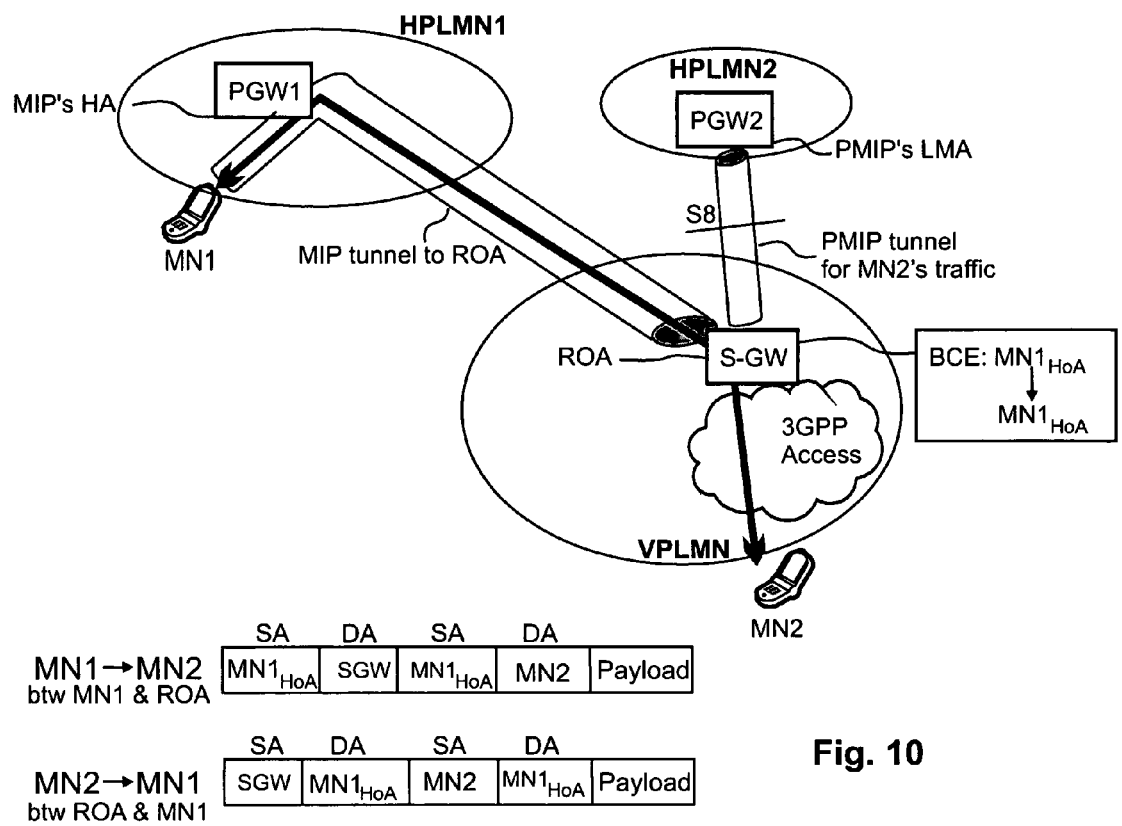
FIG. 10 illustrates a different network deployment in which MN1 is located in its home network HPLMN1 and an optimized data path is established according to one embodiment of the invention.

In the following, the route optimization according to a different embodiment of the invention will be described in case MN1 is located in its home network HPLMN1. This scenario is illustrated in FIG. 10, including the packet header formats between the ROA and the MN1 in both directions. The route optimization for this scenario corresponds in many aspects with the one described in detail with regard to FIGS. 6 and 7. The main difference resides in the establishment of the binding cache entry in the ROA/SGW. Usually, a binding cache entry in MIPv6 associates the HoA of MN with the corresponding CoA of said MN, since the home agent functionality is usually located in the home network of the MN, and the MN has a CoA from a foreign network. However, in this scenario a MN attached to the home network (also known as home link) configures a MIP tunnel with an entity having home agent functionality (i.e. ROA) that is not in the MN's home network (on the home link). Such a scenario is only possible with a MN and home agent that implement a functionality that is modified from the standard of the MIPv6 specification. As described in other parts of this invention, the MN and the home agent should be modified to be able to establish a MIP tunnel for a home address that is not topologically correct for the home agent. Therefore, the binding cache entry in the ROA in this case associates MN1's HoA with MN1's HoA, in order for the ROA to be able to transmit the data packets encapsulated over the MIP tunnel to MN1 in the HPLMN1.

If there would be no binding cache entry, the ROA would assume that the MN is attached to its link, i.e. to the 3GPP access of VPLMN, which is not the case. Accordingly, data packets transmitted from MN2 to MN1, include in the outer tunnel header and the inner header the same destination address, i.e. MN1's HoA. Correspondingly, data packets transmitted from MN1 to ROA over the MIP tunnel have the same source address, MN1's HoA, in both the outer tunnel header and the inner header.

An additional mechanism is needed to maintain the session continuity between MN1 and MN2, after the route optimization of the current invention has been performed. If MN2 moves away from its SGW during the communication session, data packets would still arrive at the old SGW and thus would not reach MN2. Two different cases may be differentiated, and will be considered in the following.

MN2 may move to a different SGW within the same PLMN, in which case two subcases are discussed.

If the route optimization agent is collocated with the SGW, a ROA switch procedure must be performed after the movement of the MN2 to a new SGW.

In the prior art, a HA switch procedure is known, according to which the old ROA could send a "HA switch" message to the MN1. However, the HA switch procedure cannot be applied when a ROA should actively move MNs to another ROA because the HA switch message of the prior art cannot be sent at all times. Therefore, a new type of ROA switch procedure is needed for the purpose of this invention.

The ROA may use the IKEv2 protocol messages to announce the new ROA to MN1. For example, according to the IKEv2 INFORMATIONAL exchange procedure, the ROA may send an IKEv2 message to the MN1 containing the address information for the new ROA. Therefore, MN1 may update its MIP tunnel to the ROA, and the data packets are correctly transmitted to the new ROA.

If the ROA is not collocated with the SGW, but with a local PGW in MN2's VPLMN (e.g. see PGW3 in FIG. 8), there is not need to change the ROA as long as the PMIP tunnel between the new SGW and the ROA can be established. The procedure for triggering the establishment of a new PMIP tunnel can be a part of the SGW re-allocation procedure within the PLMN.

In case MN2 moves to a different PLMN, the ROA) in the old PLMN (be it located in PGW3 or in SGW cannot be used anymore because first the ROA is not informed about the new MN2's location and/or second, even if somehow the ROA is informed about the MN2's new location, the ROA cannot establish a tunnel to the new MN2's access gateway because it is in a different PLMN. The ROA learns about the movement of the MN2 either because the MN2 is directly attached to the ROA (this is the case if ROA is at the SGW) or because the PMIP tunnel to the ROA is torn down (this is the case if ROA is at the PGW3). In those cases the ROA shall initiate a MIPv6 detach procedure with the MN1. After the detachment, the MN1 can either use the bi-directional MIPv6 tunnel over its original HA (i.e. PGW1), or the MN1 can initiate a new RO detection procedure to discover whether RO is needed and/or which type of RO is beneficial and/or if needed a new ROA in the new PLMN.

For the above scenarios, the assumption made is that the MN1 is attached to a non-3GPP access system and that the MN1 is allowed to perform MIP tunnel establishment to the ROA.

In the following, a different scenario will be considered, namely where the MN1 is attached to a 3GPP based access technology, i.e. to an UMTS or LTE access system. The 3GPP access technology may be presented by a macro (e)NB cell or by a micro H(e)NB cell or by a wireless relay node. In general, the notation (H)(e)NB for base stations means that the base station could be one of the following: NB, HNB, eNB or HeNB.

Figure 11:
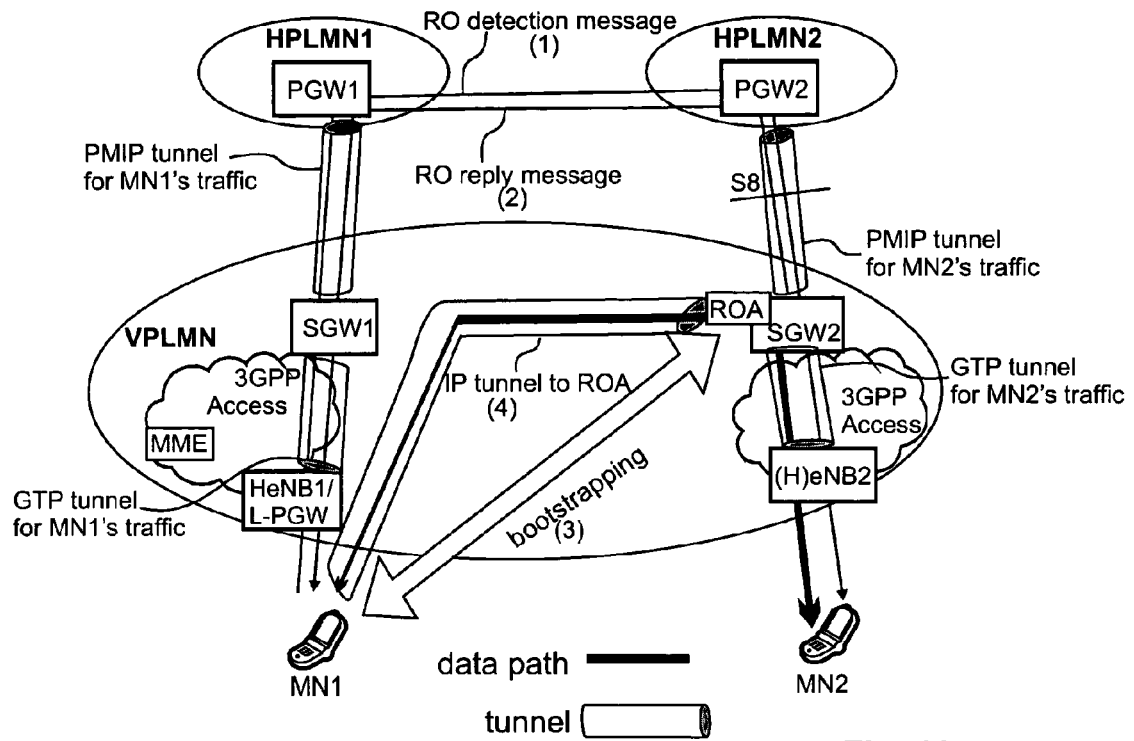
FIG. 11 illustrates a different network deployment in which the MN1 is attached to a 3GPP network and the optimized data path is established according to a further embodiment of the invention.

For the following embodiment of the invention, the scenario as depicted in FIG. 11 is considered. It is assumed that the MN1 is connected to a HeNB1 in a private company network and communicates with a MN2, which in turn may be attached to an eNB2 or HeNB in the same VPLMN. At the beginning the data between MN1 and MN2 is exchanged via their respective home networks, HPLMN1 and HPLMN2. The MN1 may decide to establish a local connection and performs Local IP access (LIPA). Correspondingly, MN1 transmits a PDN connectivity request to its MME, which in turn determines a local gateway (L-PGW) for the MN1 local PDN connection. For instance, the L-PGW may be collocated with the HeNB1. The L-PGW is determined by the MN1's MME during the local PDN connection establishment. To support the L-PGW selection procedure, the HeNB1 may for example indicate to the MME that it supports L-PGW functionality during the PDN connection establishment procedure. The MN1 configures a new IP address from the L-PGW (being the HeNB) for the local PDN connection. Thus, data packets from MN1 to MN2 would not be routed to the HPLMN1 (PGW1) and to other core network entities in the VPLMN, but directly from the HeNB1/L-PGW to the HPLMN2, based on the home address of MN2 (this is not shown in FIG. 11). FIG. 11 shows an optimization of the above described routing, namely that the MN1 may establish a tunnel to a gateway of MN2 (e.g. SGW2) using the local PDN connection, as the tunnel goes through the L-PGW. This is described in detail below.

FIG. 11 further shows that MN1 may simultaneously have a PDN connection to the HPLMN (home-routed traffic) for communication with other mobile nodes and the local PDN connection with the L-PGW for the communication with the MN2.

According to the embodiment of the invention, the RO detection message is transmitted (step (1)) from the MN1 to the MN2 so as to determine a ROA as discussed with the previous embodiments of the invention. An intercepting entity, in this case the SGW2, responds with a RO reply message (step (2)), indicating that the SGW2 can act as ROA. Thus, the MN1 discovers the MN2's SGW2 as ROA and starts bootstrapping with SGW2 (step (3)). The MN1 uses the local IP address obtained from the L-PGW(HeNB) to establish the tunnel to the ROA. During the tunnel establishment the MN1 can inform the ROA that if the destination address of the data packets coming from the MN2 is the MN1's home address from the HPLMN, then these packets shall be forwarded over the tunnel. In this way a special routing entry is established in the ROA/SGW2 to forward the packets coming from MN2 and destined to MN1 over the tunnel. In other words, the security association which is established between the ROA (SGW2) and MN1 is based on the local address of the MN1, not the home address of the MN1. Correspondingly, an IP tunnel between MN1 and the ROA is established (step (4)).

Furthermore, the routing entries and binding cache entries in the ROA have to be defined accordingly so as to ensure the proper forwarding of data packets between MN1 and MN2.

FIG. 11 illustrates the steps performed for the embodiment of the invention and depicts the data packet exchange after performing the embodiment of the invention. In more detail, MN1 transmits data packets destined to the home address of MN2 via the established IP tunnel to the ROA. The ROA forwards these data packets through a further GTP tunnel to the eNB2 of MN2, based on a corresponding routing entry associating the home address of MN2 with the GTP tunnel to eNB2. Then, the eNB2 transmits the data packets over the radio link to MN2. Conversely, data packets arriving from MN2 in the ROA (SGW2) and destined to the local address of MN1 are forwarded via the IP tunnel to MN1.

The present embodiment of the invention is in many ways similar to the previously-explained embodiments, such as described in connection with FIG. 6. For instance, the procedures for ROA discovery and tunnel establishment can be the same.

The structure of the data packet header used between MN1 and SGW2 is similar to the one as depicted in FIG. 7. The difference is that instead of the MIP tunnel, an IPsec or IP-in-IP tunnel can be used, and the inner IP header includes the original MN1's IP address (from PGW1, similar to MN1's HoA from FIG. 7) and the outer IP header includes the MN1's local address (from the L-PGW/HeNB, similar to MN1's CoA from FIG. 7).

For the scenario of FIG. 11 it is assumed that MN1 is connected to a 3GPP access. According to the current 3GPP standardizations, a MN attached to a 3GPP network is not allowed to perform MIPv6 signalling. This has implications for the embodiment of the invention, in that no MIP tunnel can be established to the ROA. While this may change in later standardizations, an alternative solution for the moment can be that the MN1 establishes an IPsec tunnel such as in case of a Virtual Private Network (VPN) to the ROA over the L-PGW (HeNB).

In the just explained embodiment of the invention, as depicted in FIG. 11, it is described that the SGW2 is discovered using the RO detection and reply messages. Alternatively, SGW2 can be discovered by the MN1 using the Domain Name System (DNS) where the MN1 send a DNS request to a DNS server, requesting the local security/serving gateway of the MN2 in the VPLMN. The DNS server then responds with the IP address of the SGW2 which is then used by the MN1 as the ROA. A further alternative relates to using the Dynamic Host Configuration Protocol (DHCP) signalling. When using DHCP in order to find a ROA entity belonging to the data path of the MN2's traffic in the specific VPLMN, the MN1 can for instance include the desired ROA name (e.g. MN2_ID.Data_Gateway.VPLMN.org) in the Home Network Identifier field of an Information-Request message. The DHCP server may know the MN2, since MN2 may use the same DHCP server. Thus, the DHCP server can reply to the MN1's request either with the IP address of the ROA entity (if available), or with an FQDN that the MN1 can later use for DNS request.

The DNS and DHCP protocols may need to be extended to include some specific information (e.g. MN2's IP address) in the corresponding requests so as to discover the SGW2 that is on the routing path or close to MN2.

In the following, further embodiments of the invention will be presented. These further embodiments of the invention deal with scenarios in which the MN1 wants to have a locally routed traffic and to said end performs LBO. Similar to the scenario of FIG. 11, the MN1 is attached to a 3GPP access technology via a micro H(e)NB or macro (e)NB. LIPA is only applicable when a MN is attached to a H(e)NB (i.e. micro cell) and not to a (e)NB (i.e. macro cell).

Usually, when a MN1 performs LBO (or LIPA) the establishment of the local PDN connection in the VPLMN by transmitting from the MN1 a request message to the network. In particular, a PDN connectivity request is transmitted to the MME of the MN1, and may comprise the EPS bearer identity, the PDN type, the Access Point Name (APN) and other information used to identify the new PDN connection that the MN1 would like to establish. If the MN1 would like to perform an LBO, i.e. to establish a PDN connection that is locally anchored in the VPLMN, the MN1 can include the appropriate information, e.g. the APN should unambiguously indicate to the MME that the PDN connection shall be local. It is also possible that the MN1 sends a request including an APN without indication for local or home-routed traffic and the network (e.g. MME and/or HSS based on policy configuration) chooses a local or home PGW.

After the MME receives the PDN connectivity request for a new PDN connection, the MME may request a subscriber database, such as an AAA (Authentication, Authorization and Accounting) server or the Home Subscriber Server, HSS, in order to resolve a suitable L-PGW for the PDN connection. In some network deployments the MME may possibly resolve the L-PGW without requesting information from other network entities. Finally, the MME would assign an L-PGW in the VPLMN and will instruct the selected SGW for this PDN connection and the eNB1 to use the selected PGW. In case of LBO the local/visited PGW (L-PGW) is usually located in the core network, whereas in case of LIPA the L-PGW is located in the access network (e.g. collocated with the HeNB as in FIG. 11).

However, the selected L-PGW may not be the optimal one with respect to the location of MN2 or MN1, especially in case of LBO. For example, the selected L-PGW may be located in the VPLMN such that the data packets may still travel a large distance though the MN1 and MN2 are located nearby in the VPLMN.

Thus, according to the following embodiments of the invention, an L-PGW is determined which is optimal for the data packet exchange between MN1 and MN2.

The following embodiment of the invention will be explained with reference to FIG. 12, which depicts the scenario in which the MN1 is connected to an eNB1 and wants to perform LBO. The MN1 may transmit a PDN connectivity request to its MME (step (1)). According to the embodiment, the PDN connectivity request additionally comprises the MN2's IP address to be used when determining the appropriate L-SPGW which shall be used by the MN1 for the data exchange with the MN2. In other words, MN1 transmits information about the MN2 so that the MME may consider the MN2's location when deciding upon the optimal L-SPGW.

The MME accordingly determines an L-SPGW for the MN1 connection to MN2 based on the received information on MN2. Advantageously, the MME determines the L-PGW to be collocated with the SGW2 of MN2 because in this way minimal number of entities on the data path is involved.

The MME shall have means to check whether the MN2 is attached to the VPLMN. If so, the MME resolves the MN2's gateway, i.e. PGW or SGW, and assigns the SGW2 as L-SPGW to MN1 for the local PDN connection. If the MN2 does not belong to the VPLMN or the MME cannot resolve a proper gateway related to the MN2, i.e. there is neither a SGW nor a PGW in the VPLMN to which the MN2 is registered/connected, the MME assigns any PGW to the MN1, similar to the state of the art.

After the MME determines that the SGW2 may perform the function of collocated local SGW and PGW (i.e. the L-SPGW), the MME informs the SGW2 that is should become a L-SPGW for the MN1's local PDN connection. This informing could be done by transmitting a create session request message to the L-SPGW (SGW2) in step (2). The SGW2 responds to the MME with a bearer setup response which might include IP address information for the MN1 local PDN connection such as the IPv6 prefix.

The MME then informs the eNB1 (e.g. by transmitting a bearer setup request message) in step (3) in order to initiate the establishing of the tunnel between eNB1 and L-SPGW (SGW2). The bearer setup request message may further have attached the PDN connectivity accept message, with which the MME may respond to the MN1 to inform the MN1 that the requested local PDN connection establishment for the local routing of data packets to MN2 was successful. Accordingly, the bearer setup request message is received by eNB1 and the attached PDN connectivity accept message is further forwarded to the MN1.

So as to configure the new IP address of MN1, the PDN connectivity accept message may include the IP prefix of L-SPGW (SGW2) received by the MME within the bearer setup response message. The MN1 upon receiving the SGW2 IP prefix configures a new IP address for further use in communication with MN2. In addition or alternatively, after the SGW2 (L-SPGW) is informed that it will be the local gateway of MN1, a router advertisement may be transmitted from SGW2 to the MN1 in order to configure the new IP address which is to be used by MN1 instead of the home address allocated in the PGW1 in HPLMN1.

It should be noted that in contrast to the previous embodiments (e.g. as depicted in FIG. 6 or 11), the tunnel (e.g. GTP/PMIP) is between the eNB1 and SGW2 (L-SPGW), not between MN1 and SGW2. Thus, the tunnel between eNB1 and L-SPGW is established.

There could be different ways how the communication between the MN1 and MN2 can be performed so that no changes to MN2 are needed, i.e. the MN2 does not notice that the MN1 uses a new local PDN connection. In a first communication option, the MN1 may start sending the data packets to MN2 using the new configured IP address of the local PDN connection as a source address. Then, the L-SPGW should implement a special function for exchanging the source IP address of the packets from MN1 to MN2, where the IP address of the local PDN connection is exchanged with the IP address of the home-routed PDN connection (home-routed traffic). This function of exchanging the source IP address can be compared to the so called source network address translation (source NAT) process performed in computer networks. This function in the L-SPGW can be activated by the MME during the PDN connection establishment phase, i.e. in step (2). Analogically the destination IP address of the packets from MN2 to MN1 shall be exchanged because the MN2 destines the packets to the old MN1 IP address. This process of exchanging destination IP addresses is the same as the destination NAT process. The L-SPGW shall exchange the destination address with the IP address configured for the local PDN connection.

A second communication option to perform the communication between MN1 and MN2 is that the MN1 continues to use the IP address of the old home-routed PDN connection as source IP address for the packets sent to the MN2 over the local PDN connection. Usually, when the MN1 communicates with other correspondent nodes over the local PDN connection, the MN1 uses the IP address that is correct for the local PDN connection, i.e. the IP address based on the IP prefix assigned by the L-PGW. However, only for the data packets to the already existing communication sessions (like to MN2) the MN1 uses the IP address configured over the old (i.e. home-routed) PDN connection. This is needed in order to keep the communication session continuity between MN1 and MN2. This second option does not introduce new problems for the eNB1 because the eNB1 forwards the packets to/from MN1 based on logical channel IDs (over the radio link) and bearer IDs (over the S1-U interface to the L-SPGW). Using this second communication option, the L-SPGW shall not apply ingress filtering (if it is applied at all) to the MN1's packets, i.e. the L-SPGW (or other routing entities in the VPLMN) shall not filter the data packets that have a source IP address different from the IP prefix assigned to the MN1. The deactivation (if needed) of the ingress filter function may be done by the MME during the local PDN connection establishment, e.g. during step (2). Further, a special routing entry may be provided in the L-SPGW to route the data packets coming from MN2 and destined to MN1 over the tunnel to eNB1. This special routing entry can be established during the step (2) when the MME informs the L-SPGW about the local PDN connection. The MME learns about the need of this special routing entry based on the PDN connectivity request received from the MN1 and containing the MN2's ID (e.g. IP address).

The second option is preferred because no new NAT (Network Address Translation) function for exchanging of source/destination IP addresses is needed in the L-SPGW. Further, exchanging IP addresses is not desired for a number of IP applications.

The eNB1 forwards said data packets via the tunnel to the L-SPGW. The data packets are encapsulated with the L-SPGW address as destination and the eNB1 address as source address.

The data packets arriving at the L-SPGW are decapsulated and forwarded over the GTP tunnel to the eNB2 and finally over the radio link to the MN2. The necessary routing entries are already present in the L-SPGW. In case of the first communication option for the communication between MN1 and MN2, the L-SPGW implements a so-called NAT function of exchanging the source IP address of the packets coming from the MN1 to the MN2. For the packets coming from the MN2 to the MN1, the L-SPGW shall exchange the destination IP address.

MN2, that does not know about the LBO according to the embodiment of the invention, keeps transmitting data packets to the MN1's home address. These are GTP tunneled from the eNB2 to the SGW2. According to the preferred second communication option of the communication between MN1 and MN2 the SGW2 has a routing entry associating the home address of MN1 to the established tunnel to eNB1, and hence, these data packets are forwarded to eNB1 and from there transmitted to MN1.

The necessary routing entries in L-SPGW can be configured using the create session request message of step (2).

In the following it will be explained how the MN1's MME discovers the MN2's SGW based on the MN2's IP address that is transmitted within the PDN connectivity request message, and in particular based on the IP prefix. Since usually the MN2's IP address is built based on the IP prefix of the PGW, the MME may have means to discover the MN2's PGW, especially when the MN2's PGW is located in the same VPLMN as the MME, and collocated with the SGW2 of MN2.

However, if the MN2's PGW is not located in the VPLMN (i.e. in the MN1's MME PLMN) it could be impossible for the MME to resolve the MN2's PGW/SGW. In said case, the MN1's MME may try to discover the MN2's MME and request it about the MN2's PGW/SGW identity. For example the MN1's MME may contact a subscriber/location server (like HSS) in the VPLMN to request if there is available MN2 entry. If the MN2 is registered in the VPLMN, the subscriber/location server should have an entry and should know the MN2's MME and corresponding SGW and/or PGW. The MN2's MME knows the MN2's PGW/SGW regardless of whether the MN2 is in idle or connected state, and responds to the MME of MN1 with the information on the SGW2.

According to an alternative embodiment of the invention, the MN1 may apply the RO detection and reply messages of previous embodiments to learn information about the MN2's location or the MN2's PDN connection used for communication with MN1. In particular, the intercepting entity may have appropriate information and generate the RO reply message to comprise the MN2's APN, or other information about the PDN connection currently used for MN2, PGW2 information (e.g. PGW2's IP address, name or ID) and/or the SGW2 information (e.g. SGW2's IP address, name or ID).

Figure 12:
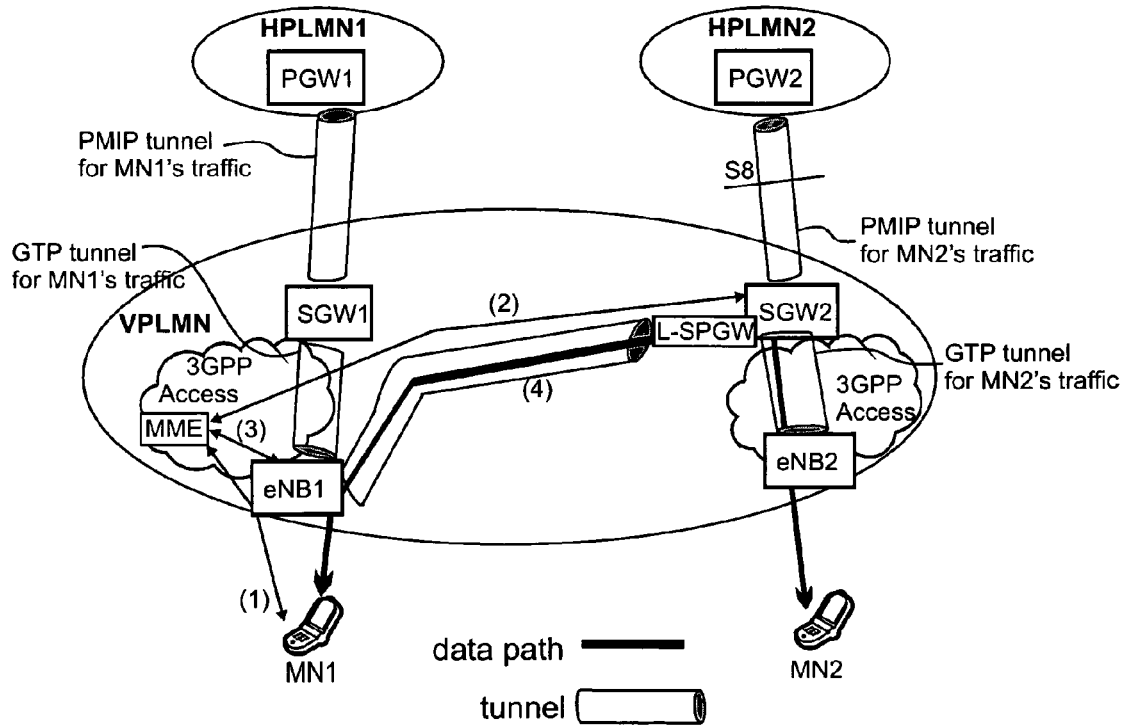
FIG. 12 illustrates a network deployment similar to FIG. 11, in which however the L-PGW is determined according to an embodiment of the invention.

It may also be possible that MN2 has applied LIPA (when attached to a HeNB2, instead of the eNB2 as depicted in FIG. 12), in which case the RO reply message may also contain information about the MN2's local gateway (MN2's L-PGW). For instance, when the MN2 has a local PDN connection (standard LBO or LIPA) in VPLMN, the MME could even assign the MN2's L-PGW as L-SPGW for MN1.

When the MN1 receives the "RO reply message, the MN1 should signal the discovered MN2's information to the MME within the PDN connectivity request of step (1). Put differently, the MN1 can assist the MME with information obtained from the RO reply message as to the determination of the optimal L-PGW for MN1 in connection with MN2.

In the following, a scenario is assumed in which no direct tunnel connection between the eNB1 and the SGW2 is possible, for whatever reasons. For instance, the MN1's eNB2 may not be allowed to establish the tunnel to SGW2 depending on the location in the network. In said case, the previous embodiment of the invention cannot be applied, and a variant thereof will be explained below.

The MME when determining an optimal L-PGW for the MN1 (e.g. SGW2) based upon the MN2's IP address according to the previous examples, learns that a direct tunnel connection between eNB1 and SGW2 will not be possible, or the MME is not able to use the SGW2 as a SGW for MN1 due to a network configuration or geographical distance. Correspondingly, the MME determines a L-SGW which is accessible for the eNB1, e.g. the SGW1 used for the home-routed PDN connection of MN1. In addition, the L-PGW is determined by the MME to be collocated with the SGW2, similar to the previous embodiments.

Figure 13:
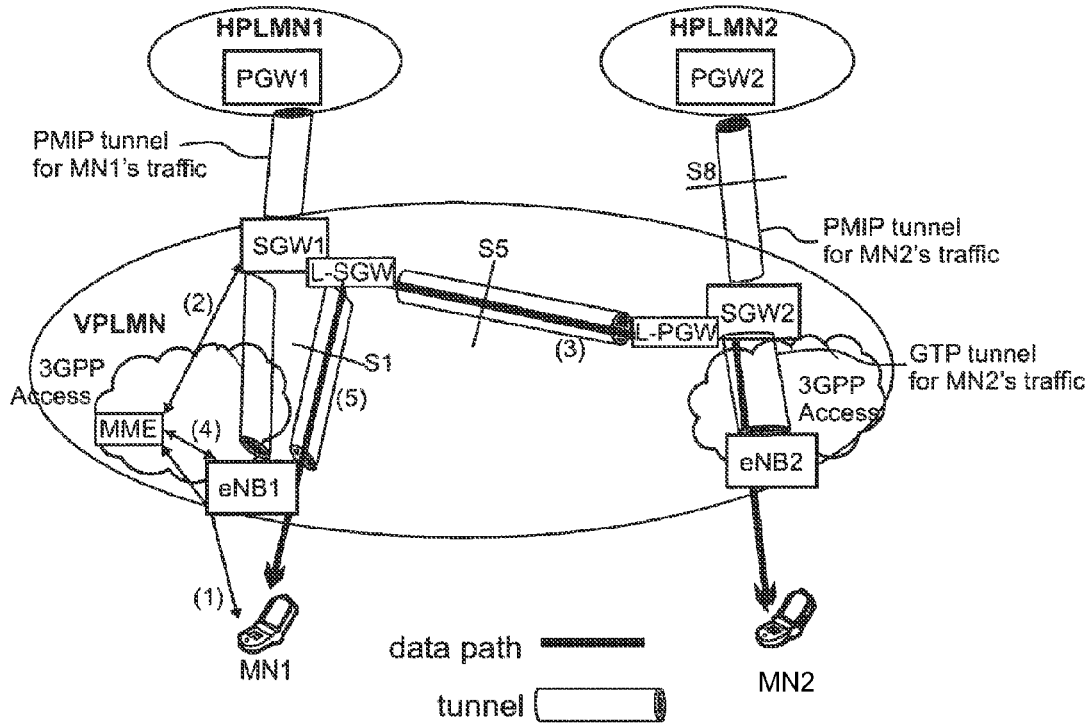
FIG. 13 shows a further network deployment in which the optimized data path, established according to a further embodiment of the invention, is composed of an additional tunnel between the SGWs of MN1 and MN2 and a tunnel between the eNB1 of MN1 and the SGW1 of MN1.

FIG. 13 illustrates this scenario and the corresponding network configuration. In step (1) the MN1 transmits the PDN connectivity request message including the MN2's IP address to the MME. Step (2) relates to the transmission of a message (e.g. create session request message) from the MME to the L-SGW which is determined by the MME to be the SGW1 in response to the PDN connectivity request. The create session request message comprises the IP address of the SGW2 SGW2 and the eNB ID (e.g. eNB1) to which the MN1 is attached. The SGW1, as L-SGW, is also instructed to establish a tunnel over the S5 interface with L-PGW, collocated with SGW2, as depicted in FIG. 13 in step (3). For instance the MME may use the create session request message to inform the L-SGW about the S5 tunnel and related information. During the tunnel establishment the L-PGW (SGW2) informs the L-SGW (SGW1) about the IPv6 prefix that is assigned to the MN1 for the local PDN connection. The SGW1 then responds to the MME to acknowledge the successful tunnel establishment to L-SGW (e.g. with a create session response message), including the IPv6 prefix information for the MN1 learned from the SGW2.

According to step (4) the MME then instructs the eNB1 (e.g. transmitting bearer setup request message) so that the tunnel over the S1-U interface is established between eNB1 and SGW1. The bearer setup request message may contain the PDN connectivity accept message (to the MN1) comprising the SGW2 IP prefix attached thereto, as previously discussed for the MN1 to configure a new IP address.

The eNB1 initiates the tunnel establishment with the L-SGW, which based on the information transmitted within the create session request message is able to verify and conduct the tunnel establishment with eNB1.

Alternatively, the already established tunnel for the home routed traffic can be reused for exchanging data packets between eNB1 and SGW1 (L-SGW). In said case, it would be necessary to define new routing entries in the eNB1 and SGW1 because of the new IP address which is established for the MN1 based on the selected L-PGW (SGW2). Note that the eNB1 may forward the MN1's data packets based on bearer identifiers used over the radio interface and the S1-U interface and not based on IP addresses. In more detail, in SGW1 a routing entry for the downlink traffic could be defined that associates the new destination IP address of MN1 (being the new local IP address) with the already established tunnel to eNB. In the uplink, the SGW1 should differentiate the packets coming from the MN1 to determine whether they should be sent to PGW1 or SGW2. For this purpose the SGW1 may inspect the source IP address, e.g. if the source IP address belongs to the home-routed PDN connection, the packets are transmitted to PGW1 and if the source IP address belongs to the local PDN connection, the packets are transmitted to PGW1. One exception should be done for the data packets form MN1 to MN2 that depending on the used communication option as described below.

The communication between MN1 and MN2 can be performed similarly as described already in the embodiment for FIG. 12. With other words the first and second communication options can be applied. For the following it is assumed that a further tunnel over the S1-U interface is established for the local routing of MN1 with MN2.

Corresponding routing entries in SGW1 and SGW2 are to be defined for the correct forwarding of data packets between MN1 and MN2. In detail, the SGW2 as L-PGW has a routing entry associating the home address of the first communication node (since MN2 keeps transmitting the data packets to the MN1's home address) with the established tunnel to the SGW1, as L-SGW. The routing entry in SGW2 may be established in response to a corresponding indication during the S5 tunnel establishment between SGW1 and SGW2.

On the other hand, in the SGW1 a routing entry is configured that makes a connection between the destination address being the MN1's home address with the tunnel to the eNB1 over the S1-U interface. Another routing entry in SGW1 relates the home address of MN2 as destination address with the tunnel to the SGW2 (L-PGW). In the eNB1 a routing entry associates the MN2's home address as destination with the established tunnel to L-SGW, SGW1.

Accordingly, an optimal locally routed data path is defined via the SGW1 and SGW2 for traffic between MN1 and MN2.

Alternatively to the first and second communication options from FIG. 12, the MN1 may also re-establish the connection to MN2 after configuring the new IP address. This would avoid said special routing entries, which are defined to "translate" or exchange the IP addresses between the previously used home address of the MN1 (which is further used by MN2) and the newly configured local address of MN1 (configured with the L-PGW's IP prefix). However, the necessary end-to-end signalling between MN1 and MN2 and a possible restricted mobility when the MN1 changes to a different PLMN, are disadvantageous in said respect. This alternative applies correspondingly to the embodiment according to FIG. 12, as well as to the subsequent embodiments according to FIGS. 14, 15 and 16.

The following refers to a scenario in which SIPTO is performed by the network instead of LBO or LIPA, namely when the network decides to locally route the MN1's traffic without involvement of the MN1. Accordingly, an entity in the VPLMN, e.g. the SGW1, monitors the MN1's traffic and determines that the MN1 is communicating with MN2, which is attached to the same PLMN. The entity (e.g. SGW1) in the VPLMN as a consequence decides to locally route the traffic between MN1 and MN2 without routing the data packets to the respective HPLMNs. In said case, the SGW1 may inform the MN1's MME for the possible optimization. The MME may decide to establish a tunnel between SGW1 and SGW2, and accordingly instructs them to establish the appropriate routing entries for data packets exchanged between MN1 and MN2. Since SIPTO is network controlled, there is no signalling needed to MN1 or MN2.

In the previous embodiments it is assumed that the SGW2 can be selected as L-PGW or L-SGW. However, in case the SGW2 cannot be selected, the SGW1 can be used as L-SPGW, a combined L-SGW and L-PGW. In this case however the MME should also consider the location of the MN1 so as to discover the local SGW and local PGW. The MME usually knows the SGW1 of the MN1, however the MN1 may also transmit the cell TAI (tracking area identifier) of MN1 to the MME in the PDN connectivity request message, so as to make sure that the MME actually considers the MN1's location and thus would select the SGW2 and not any gateway as L-SPGW.

LTE-A Support of Relay Node Functionality

Relaying (implemented by a relay node) is considered for LTE-Advanced as a tool to improve e.g. the coverage of high data rates, group mobility, temporary network deployment, the cell-edge throughput and/or to provide coverage in new areas. Thus, there are recent activities in the 3GPP to introduce a wireless relay node (RN) entity to extend the coverage of the eNB cell. The RN may form an independent physical cell.

The relay node is wirelessly connected to radio-access network via a donor cell and can be stationary or mobile.

The connection can be
  inband, in which case the network-to-relay link shares the same band with direct network-to-user equipment links within the donor cell. Rel. 8 user equipments should be able to connect to the donor cell in this case.
  outband, in which case the network-to-relay link does not operate in the same band as direct network-to-user equipment links within the donor cell.

With respect to the knowledge in the user equipment, relays can be classified into
  transparent, in which case the user equipment is not aware of whether or not it communicates with the network via the relay.
  non-transparent, in which case the user equipment is aware of whether or not it is communicating with the network via the relay.

Usually, the RN architecture deployment foresees that the RN emulates an eNB to the UE, i.e. the UE would see the RN as a usual eNB. From the network side, the RN is seen as a usual UE by the eNB.

Figure 14:
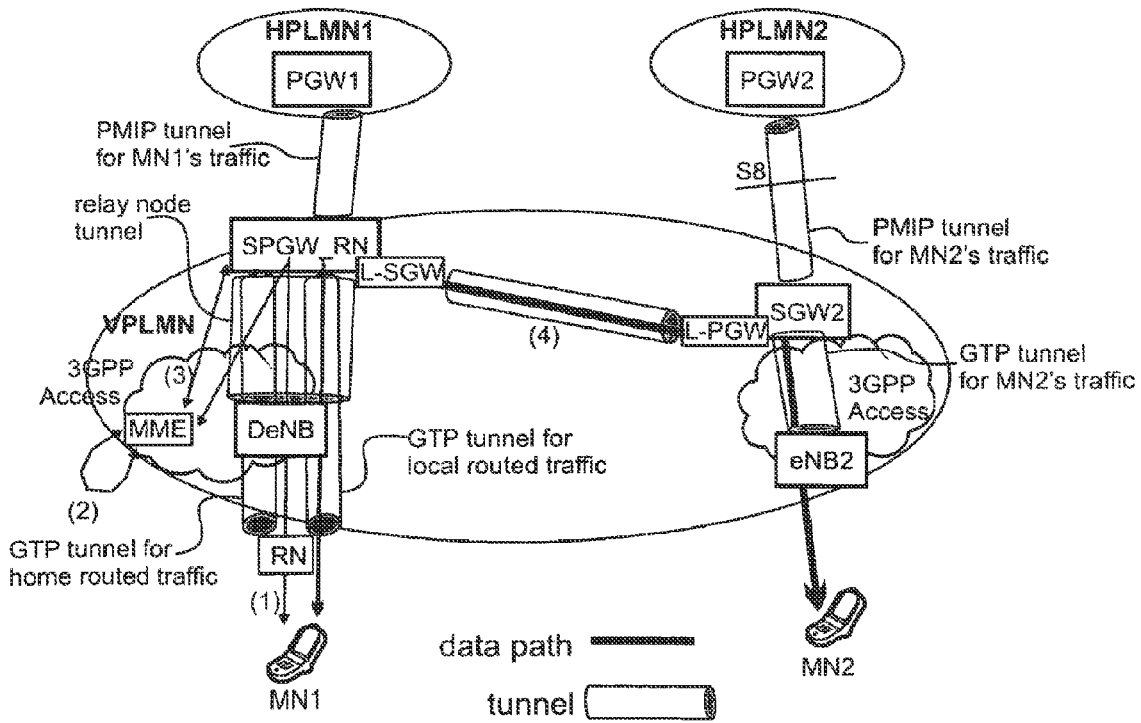
FIG. 14 illustrates a different network deployment in which the MN1 is attached to the network via a RN, and the optimized data path is established according to a further embodiment of the invention.

The following scenarios to which the embodiments of the invention will be applied are based on the assumption that MN1 is attached to a RN, as exemplary illustrated in FIG. 14. As apparent therefrom, the RN is wirelessly attached to the VPLMN via a DeNB. Furthermore, since according to 3GPP specification the RN can be seen by the network as a usual MN, the RN has its own PDN connection to the RN's PGW, which is assumed for simplicity reasons to be collocated with the SGW of the RN, thus denoted SPGW_RN. It is further assumed that the SPGW_RN is collocated with the SGW1 of MN1, so that the S8 interface, which is usually setup between the MN1's SGW in the VPLMN and PGW in the HPLMN, is shown as the tunnel between the SPGW_RN and the PGW1. The RN's traffic is tunneled from the DeNB (being a eNB for the RN) to the SPGW_RN, as this tunnel is denoted as "relay node tunnel" or S1-U tunnel for the RN. In addition, the MN1 traffic is tunneled within a GTP tunnel from RN to SGW1, being collocated with SPGW_RN. Before applying the embodiments of the invention, the MN1 data packets would be tunneled via the PMIP tunnel to the PGW1 at HPLMN1 and from there further forwarded to PGW2 and MN2 (not shown in FIG. 14).

According to a further embodiment of the invention, the MN1 starts the LBO by transmitting a PDN connectivity request message to the MME (step (1)). As illustrated by FIG. 14, the PDN connectivity request message is transmitted within the RN tunnel to the SPGW_RN, and from there forwarded to the MN1's MME. Again the PDN connectivity request message may contain the MN2's IP address, which is considered by the MME when determining the appropriate local gateway(s) (L-SGW and L-PGW). Based on the MN2's IP address, the MME discovers the SGW2 as possible L-SPGW, however determines that a direct tunnel connection between the RN or DeNB with the SGW2 is not possible, due to the RN tunnel.

In said respect, the MME should be aware that the MN1 is connected to a RN and not to a fixed eNB. As already mentioned before, from MN1 network perspective the RN appears to be an eNB. However, if the MN1 is aware that it is connected to a RN (e.g. by a special flag advertised by the RN), the MN1 may include corresponding information in the PDN connectivity request message of step (1). Alternatively, the RN may use the particular signalling between the RN and MME (called S1-AP signalling) to inform the MME that the MN1 is connected to a RN.

After the MME learns that the MN1 is attached to a RN and no direct connection from the DeNB to the SGW2 is possible, the MME should determine a L-SGW for the local PDN connection which is accessible from the RN. In more detail, the MME may first determine whether MN1 is roaming (which is assumed in the scenarios) and whether LBO has to be performed. If the above conditions are not fulfilled, e.g. the MN1 desires the establishment of a home-routed traffic, there is normally no reason for the MME to resolve the SPGW_RN, because the MN1's PGW is assigned by the HPLMN1 (the MME needs to assign merely an SGW to MN1). However, if the HPLMN1 and VPLMN would like to perform LBO in a later phase after the home-routed PDN connection has been established, it could be advantageous to assign the SGW of MN1 to be collocated with the SPGW_RN.

Conversely, if the above conditions are fulfilled, the SPGW_RN is to be assigned as L-SGW to the MN1 for the local-routed traffic.

According to the embodiment of the invention, the MME starts resolving the SPGW_RN in order to assign it as L-SGW to the MN1. There are various alternatives to how the MME may resolve the SPGW_RN, which are presented in the following.

According to one embodiment, the RN may include the ID of its own MME in an S1-AP message to the MME of the MN1. Then, the MN1's MME would contact the RN's MME and ask about the SPGW_RN used for the RN.

According to a further embodiment, the MN1's MME knows the RN's IP address, e.g. from an S1-AP message sent from the RN. The MN1's MME could have means to resolve the SPGW_RN based on the RN's IP address, since the RN's IP address is built based on the RN's PGW prefix.

According to still another embodiment, the RN includes its APN in an S1-AP message to the MN1's MME, which uses the RN's APN to resolve the SPGW_RN. Advantageously, the presence of the RN's APN can be used by the MN1's MME as an indication that the UE is attached to an RN, wherein this information is also necessary for the MME as previously discussed. Furthermore, resolving the SPGW_RN using the RN's APN may be easier than using the RN's IP address, because the MME may not know the IP prefixes used by the PGW, but knowing the APN, the MME may apply DNS to resolve the PGW. For this reason using the APN may be advantageous embodiment of the invention.

In summary, the MME is able to determine the SPGW_RN and then assigns the L-SGW to be collocated with the SPGW_RN. The SGW2 is determined to be the L-PGW.

The MME then instructs the RN and the L-SGW (SPGW_RN) to establish an S1-U tunnel among each other for the LBO PDN connection. Respectively, the L-SGW is also instructed to establish a S5 tunnel with the L-PGW in the SGW2.

Accordingly, the traffic between MN1 and MN2 is to be forwarded over the established tunnels for local routing between RN, L-SGW and L-PGW. In order to do that routing entries might be necessary, similar to the routing entries explained in connection with the embodiment of FIG. 13. Alternatively, the communication session between MN1 and MN2 may be re-established using the new IP address of the MN1; however, signalling to/from the MN2 may be done in this case. In order to avoid the end-to-end signalling for re-establishing the MN1-MN2 session using the new IP address of the local PDN connection, the first and second communication options between MN1 and MN2 as explained for FIG. 12 can be applied.

It is assumed that a new GTP tunnel for local routed traffic is established between RN and L-SGW. However, as already mentioned for a previous embodiment, the tunnel for home routed traffic might be re-used, instead; in this case, appropriate routing entries in the RN and the SPGW_RN are to be defined.

Figure 15:
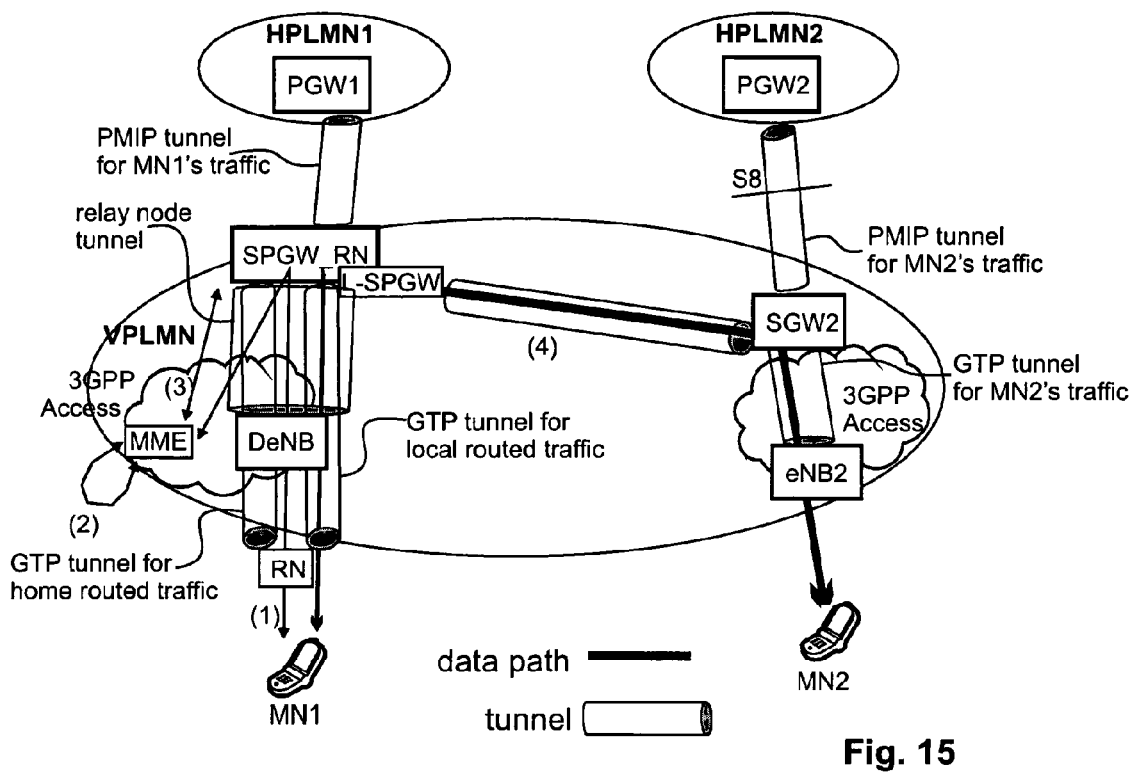
FIG. 15 illustrates a network deployment similar to FIG. 14, where the determination of the L-SGW and L-PGW is different from the one of FIG. 14.
Figure 16:
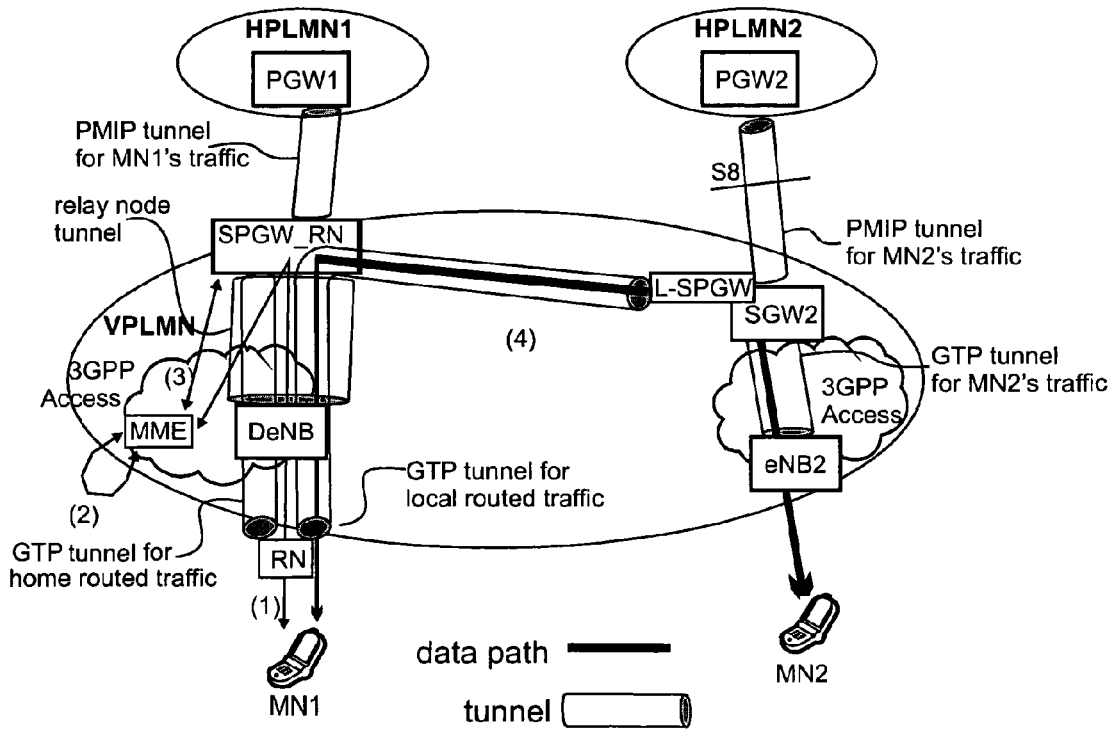
FIG. 16 illustrates a network deployment similar to FIGS. 14 and 15, where the determination of the L-SGW and L-PGW is different from the one of FIG. 14 and FIG. 15.

In FIGS. 15 and 16 embodiments of the invention are presented that are alternative to the one of FIG. 14. The scenarios are very similar, however the decision taken by the MME with regard to the L-SGW and L-PGW are different as will be explained in further detail below.

According to the embodiment illustrated in FIG. 15, the MME might determine the L-SGW and L-PGW to be collocated with the SPGW_RN. In this case, the IP address of the MN1 will not be configured on the IP prefix of SGW2 but of SPGW_RN since the L-PGW is collocated with the SPGW_RN. Apart from this difference, the embodiment of the invention is the same, and two tunnels are to be established to forward the data packets between the MN1 and MN2 over the local routed data path.

For the embodiment of FIG. 16, it is assumed that the MME determines the SGW2 as L-PGW and L-SGW. In said case, the MME must still instruct the RN to establish a S1-U tunnel for the MN1 traffic, in this case however with the L-SPGW (SGW2). The S1-U tunnel for the MN1's traffic still goes over the RN1's S1 tunnel between the DeNB and the SPGW_RN.

The explanations given in the Technical Background section above are intended to better understand the specific exemplary embodiments described herein and should not be understood as limiting the invention to the described specific implementations of processes and functions in the mobile communication network. Nevertheless, the improvements proposed herein may be readily applied in the architectures/systems described in the Technological Background section and may in some embodiments of the invention also make use of standard and improved procedures of theses architectures/systems. It would be appreciated by a person skilled in the art that numerous variations and/or modifications may be made to the present invention as shown in the specific embodiments without departing from the spirit or scope of the invention as broadly described.

Another embodiment of the invention relates to the implementation of the above described various embodiments using hardware and software. It is recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

The invention claimed is:

1. A method for optimizing a data path along which data packets are exchanged between a first communication node and a second communication node in a communications system, wherein at least the first communication node is located in a foreign network, the method comprising the steps of:
    transmitting from the first communication node a local connection request to a management entity of the first communication node in the foreign network, the local connection request comprising identity information of the second communication node,
    determining by the management entity in the foreign network in response to the received local connection request a local data gateway in the foreign network based on the identity information of the second communication node, wherein the local data gateway is determined to be a gateway of the second communication node in the foreign network or a gateway of the first communication node in the foreign network, and
    exchanging all data packets between the first and second communication node via the local data gateway,
    wherein the local data gateway is the gateway used by the second communication node, the method further comprising the step of:
    establishing a tunnel between a radio control entity, to which the first communication node is attached in the foreign network, and the local data gateway, wherein the data packets are forwarded between the radio control entity and the local data gateway over the established tunnel;
    wherein the management entity in the foreign network determines the gateway used by the second communication node based on the identity information of the second communication node;
    the method further comprising the steps of:
    transmitting by the first communication node a gateway detection message towards the second communication node,
    intercepting by an intercepting entity on the data between the first and second communication nodes the gateway detection message, and transmitting in response a gateway detection reply message to the first communication node comprising information on the gateway used by the second communication node,
    wherein the local connection request transmitted from the first communication node to the management entity of the first communication node comprises the received information on the gateway used by the second communication node, and
    wherein the gateway used by the second communication node is determined by the management entity based on the information on the gateway used by the second communication node received in the local connection request.

2. The method according to claim 1, wherein the management entity in the foreign network instructs the radio control entity and the local data gateway to establish the tunnel between them.

3. The method according to claim 1, wherein the identity information of the second communication node is an IP (Internet Protocol) address, and the management entity in the foreign network infers the gateway used by the second communication node from the IP prefix of the IP address of the second communication node.

4. The method according to claim 1, wherein the management entity in the foreign network transmits a request to a management entity of the second communication node, and the management entity of the second communication node transmits information on the gateway used by the second communication node to the management entity of the first communication node.

5. The method according to claim 1, further comprising the step of:
    defining in the local data gateway a routing entry associating the home address of the first communication node with the established tunnel to the radio control entity for forwarding data packets, coming from the second communication node and destined to the home address of the first communication node, from the local data gateway to the radio control entity using the established tunnel.

6. A method for optimizing a data path along which data packets are exchanged between a first communication node and a second communication node in a communications system, wherein at least the first communication node is located in a foreign network, the method comprising the steps of:
    transmitting from the first communication node a local connection request to a management entity of the first communication node in the foreign network, the local connection request comprising identity information of the second communication node,
    determining by the management entity in the foreign network in response to the received local connection request a local data gateway in the foreign network based on the identity information of the second communication node, wherein the local data gateway is determined to be a gateway of the second communication node in the foreign network or a gateway of the first communication node in the foreign network, and
    exchanging all data packets between the first and second communication node via the local data gateway,
    wherein the local data gateway is the gateway used by the second communication node, and wherein a serving gateway of the first communication node is determined by the management entity to be the local serving gateway of the first communication node, further comprising the steps of:
    establishing a tunnel between the serving gateway of the first communication node in the foreign network and the local data gateway, wherein the data packets are forwarded between the serving gateway and the local data gateway over the established tunnel, and establishing a second tunnel between a radio control entity, to which the first communication node is attached in the foreign network, and the serving gateway of the first communication node, wherein the data packets are forwarded between the radio control entity and the serving gateway of the first communication node over the established second tunnel.

7. The method according to claim 6, wherein the management entity of the first communication node instructs the serving gateway to establish the tunnel with the local data gateway, and instructs the serving gateway and the radio control entity to establish the second tunnel.

8. The method according to claim 6, further comprising the step of:

defining in the local data gateway a routing entry associating the home address of the first communication node with the established tunnel to the serving gateway for forwarding data packets, coming from the second communication node and destined to the home address of the first communication node, from the local data gateway to the serving gateway using the established tunnel, defining in the serving gateway of the first communication node another routing entry associating the home address of the first communication node with the established second tunnel to the radio control entity, defining in the serving gateway of the first communication node another routing entry associating the home address of the second communication node with the established tunnel to the local data gateway, and defining in the radio control entity another routing entry associating the home address of the second communication node with the established second tunnel to the serving gateway of the first communication node.

9. A method for optimizing a data path along which data packets are exchanged between a first communication node and a second communication node in a communications system, wherein at least the first communication node is located in a foreign network, the method comprising the steps of:

transmitting from the first communication node a local connection request to a management entity of the first communication node in the foreign network, the local connection request comprising identity information of the second communication node, determining by the management entity in the foreign network in response to the received local connection request a local data gateway in the foreign network based on the identity information of the second communication node, wherein the local data gateway is determined to be a gateway of the second communication node in the foreign network or a gateway of the first communication node in the foreign network, and exchanging all data packets between the first and second communication node via the local data gateway, wherein the first communication node is attached to a relay node, and data packets to and from the first communication node are tunneled between the relay node and a relay node gateway being the serving gateway of the first communication node, and the local data gateway is determined to be the gateway used by the second communication node, the method further comprising the step of:

instructing the relay node gateway by the management entity of the first communication node to establish a tunnel to the local data gateway.

10. The method according to claim 9, further comprising the steps of:

transmitting by the first communication node or the relay node information to the management entity of the first communication node about the first communication node being attached to the relay node, and determining the relay node gateway by the management entity of the first communication node based on the received information on the relay node.

11. The method according to claim 10, wherein the step of informing the management entity includes transmitting an access point name of the relay node to the management entity of the first communication node, and the step of determining the relay node gateway is based on the access point name of the relay node.

12. A method for optimizing a data path along which data packets are exchanged between a first communication node and a second communication node in a communications system, wherein at least the first communication node is located in a foreign network, the method comprising the steps of:

transmitting from the first communication node a local connection request to a management entity of the first communication node in the foreign network, the local connection request comprising identity information of the second communication node, determining by the management entity in the foreign network in response to the received local connection request a local data gateway in the foreign network based on the identity information of the second communication node, wherein the local data gateway is determined to be a gateway of the second communication node in the foreign network or a gateway of the first communication node in the foreign network, and exchanging all data packets between the first and second communication node via the local data gateway, wherein the local data gateway is determined to be the gateway used by the first communication node in the foreign network, based on information on the location of the first communication node in the foreign network, the method further comprising the steps of:

determining by the management entity of the first communication node a gateway of the second communication node in the foreign network, based on the identity information of the second communication node, and establishing a tunnel between the local data gateway and the gateway of the second communication node in the foreign network, for forwarding data packets between the local data gateway and the gateway of the second communication node.

13. A communication node that exchanges data packets with a second communication node in a communications system, wherein the communication node is located in a foreign network, the communication node comprising:

a transmitter adapted to transmit a local connection request to a management entity of the communication node in the foreign network, the local connection request comprising identity information of the second communication node, wherein the local connection request and the comprised identity information of the second communication node are used by the management entity to determine a local data gateway in the foreign network to be either a gateway of the second communication node or a gateway of the communication node in the foreign network, wherein the communication node has a home IP address, and further comprises a receiver, adapted to receive from the local data gateway or the management entity IP address information on the local data gateway, wherein a processor of the communication node is adapted to configure a new local IP address for the communication node based on the IP address information on the local data gateway, and wherein the transmitter is further adapted to transmit data packets to the second communication node using the home IP address, and data packets to other communication nodes using the local IP address of the communication node.

14. The communication node according to claim 13, wherein the local connection request transmitted to the management entity further comprises a cell identifier of a cell to which the communication node is attached.

15. A communication node that exchanges data packets with a second communication node in a communications system, wherein the communication node is located in a foreign network, the communication node comprising:

a transmitter adapted to transmit a local connection request to a management entity of the communication node in the foreign network, the local connection request comprising identity information of the second communication node, wherein the local connection request and the comprised identity information of the second communication node are used by the management entity to determine a local data gateway in the foreign network to be either a gateway of the second communication node or a gateway of the communication node in the foreign network, wherein the communication node is attached to a relay node, and data packets to and from the communication node are tunneled between the relay node and a relay node gateway, the communication node comprising:

the transmitter adapted to transmit information to the management entity of the communication node about the communication node being attached to the relay node.

* * * * *